(12) United States Patent
Tateno

(10) Patent No.: US 12,291,632 B2
(45) Date of Patent: May 6, 2025

(54) EPOXY RESIN COMPOSITION

(71) Applicant: SEKISUI CHEMICAL CO., LTD., Osaka (JP)

(72) Inventor: Shiori Tateno, Shiga (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 659 days.

(21) Appl. No.: 17/278,841

(22) PCT Filed: Sep. 10, 2019

(86) PCT No.: PCT/JP2019/035487
§ 371 (c)(1),
(2) Date: Mar. 23, 2021

(87) PCT Pub. No.: WO2020/066592
PCT Pub. Date: Apr. 2, 2020

(65) Prior Publication Data
US 2022/0041855 A1    Feb. 10, 2022

(30) Foreign Application Priority Data

Sep. 26, 2018 (JP) ................................ 2018-180328

(51) Int. Cl.
*C08L 63/00* (2006.01)
*C08F 216/38* (2006.01)

(52) U.S. Cl.
CPC ............ *C08L 63/00* (2013.01); *C08F 216/38* (2013.01)

(58) Field of Classification Search
CPC ............................. C08L 63/00; C08F 216/38
USPC ....................................................... 528/107
See application file for complete search history.

(56) References Cited

U.S. PATENT DOCUMENTS

| | | | |
|---|---|---|---|
| 2004/0260020 A1 | 12/2004 | Miyake et al. | |
| 2018/0194935 A1 | 7/2018 | Maeda et al. | |
| 2019/0276718 A1 | 9/2019 | Tateno et al. | |

FOREIGN PATENT DOCUMENTS

| | | | | |
|---|---|---|---|---|
| CN | 1555590 | 12/2004 | | |
| CN | 107406652 | 11/2017 | | |
| JP | 55-108443 | 8/1980 | | |
| JP | 2-4888 | 1/1990 | | |
| JP | 6-212138 | 8/1994 | | |
| JP | 09137141 A | * 5/1997 | ............ | C09J 129/14 |
| JP | 2000-212532 | 8/2000 | | |
| JP | 2008-531817 | 8/2008 | | |
| JP | 2008-297346 | 12/2008 | | |
| JP | 2010202862 A | * 9/2010 | ............ | C08G 59/42 |
| JP | 2013-72027 | 4/2013 | | |
| JP | 2013-110084 | 6/2013 | | |
| JP | 2014-198767 | 10/2014 | | |
| JP | 2015-108077 | 6/2015 | | |
| JP | 2015-196755 | 11/2015 | | |
| JP | 2018-53200 | 4/2018 | | |
| WO | 2006/093949 | 9/2006 | | |
| WO | 2014/203797 | 12/2014 | | |
| WO | 2018/062205 | 4/2018 | | |

OTHER PUBLICATIONS

Matsuda, JP 2010-202862 A machine translation in English, Sep. 16, 2010/ (Year: 2010).*
Kori et al., JP 09-137141 A machine translation in English, May 27, 1997. (Year: 1997).*
International Search Report issued Nov. 26, 2019 in International (PCT) Application No. PCT/JP2019/035487.

* cited by examiner

*Primary Examiner* — David T Karst
(74) *Attorney, Agent, or Firm* — Wenderoth, Lind & Ponack, L.L.P.

(57) ABSTRACT

The present invention provides an epoxy resin composition capable of exhibiting high moisture resistance and reducing reduction in adhesion at high temperature and high humidity. Provided is an epoxy resin composition containing: a modified polyvinyl acetal resin containing a hydrogen-bonding group-containing constitutional unit; and an epoxy resin, the modified polyvinyl acetal resin having an equilibrium moisture absorption of 5 to 20% by weight as measured with an infrared moisture meter after standing at 40° C. and 90% RH for seven days.

8 Claims, No Drawings

EPOXY RESIN COMPOSITION

TECHNICAL FIELD

The present invention relates to an epoxy resin composition capable of exhibiting high moisture resistance and reducing reduction in adhesion at high temperature and high humidity.

BACKGROUND ART

Epoxy adhesive compositions mainly containing epoxy resins and curing agents are typical adhesive compositions having excellent properties such as adhesiveness, heat resistance, chemical resistance, and electric characteristics. They are used in various fields such as bonding of parts in vehicles including automobiles, aircraft, buildings, and electronic components.

Patent Literature 1, for example, discloses that high heat resistance is exhibited by an adhesive composition containing: a butyral resin; an epoxy resin that is a mixture of a diphenylpropane novolac-type resin and an epichlorohydrin/bisphenol-type resin; a phenol novolac resin oligomer; and an imidazole compound.

Patent Literature 2 discloses that an adhesive composition for structure containing an epoxy compound, an amine curing agent, and a hydroxy substitution-structured compound can exhibit high heat resistance.

Patent Literature 3 discloses that a two-component epoxy adhesive composition containing a first epoxy resin, a second epoxy resin, and an amine compound is less likely to be washed away even without precuring and can be stored in an uncured state.

Patent Literature 4 discloses that an adhesive composition for structure containing an epoxy resin, core-shell rubber particles, and a curing agent is less likely to be damaged by a flowing water pressure of rinse water.

CITATION LIST

Patent Literature

Patent Literature 1: JP H02-4888 A
Patent Literature 2: JP H06-212138 A
Patent Literature 3: JP 2008-531817 T
Patent Literature 4: JP 2015-108077 A

SUMMARY OF INVENTION

Technical Problem

These epoxy adhesive compositions however exhibit high moisture absorbency. When they are applied to an adherend such as a substrate before storage, they unintendedly absorb moisture to exhibit insufficient adhesion due to reduction in reactivity with a curing agent. Accordingly, in assembly of vehicle bodies, when the process stops after application of the adhesive composition or parts to which the adhesive composition has been applied are transported before assembly, the adhesiveness unfortunately becomes insufficient, lowering the adhesion reliability.

The present invention aims to provide an epoxy resin composition capable of exhibiting high moisture resistance and reducing reduction in adhesion at high temperature and high humidity.

Solution to Problem

The present invention relates to an epoxy resin composition containing: a modified polyvinyl acetal resin containing a hydrogen-bonding group-containing constitutional unit; and an epoxy resin; the modified polyvinyl acetal resin having an equilibrium moisture absorption of 5 to 20% by weight as measured with an infrared moisture meter after standing at 40° C. and 90% RH for seven days.

Hereinbelow, the present invention is specifically described.

The present inventor made intensive studies to find out that, when a modified polyvinyl acetal resin containing a hydrogen-bonding group-containing constitutional unit and having an equilibrium moisture absorption equal to or higher than a prescribed value is added to an epoxy resin composition, the modified polyvinyl acetal resin preferentially captures and absorbs moisture compared to an epoxy resin, which reduces reduction in curing reactivity of the epoxy resin. Thus, the present invention was completed.

The epoxy resin composition of the present invention contains a modified polyvinyl acetal resin containing a hydrogen-bonding group-containing constitutional unit.

Such a modified polyvinyl acetal resin, when used together with an epoxy resin, preferentially captures and absorbs moisture to reduce reduction in curing reactivity of the epoxy resin. The modified polyvinyl acetal resin also forms a crosslinked structure with the epoxy resin, thereby improving the mechanical strength of the resulting cured product, as well as imparting moderate elasticity.

The modified polyvinyl acetal resin contains a hydrogen-bonding group-containing constitutional unit.

The modified polyvinyl acetal resin containing the hydrogen-bonding group-containing constitutional unit can exhibit high moisture absorbency in a high temperature environment to reduce moisture absorption by the epoxy resin.

The hydrogen-bonding group refers to a functional group capable of forming a hydrogen bond, other than a hydroxyl group. The hydrogen-bonding group-containing constitutional unit refers to a unit containing the hydrogen-bonding group in a side chain.

The modified polyvinyl acetal resin contains the hydrogen-bonding group-containing constitutional unit having an SP value (solubility parameter) of preferably 11.0 to 18.5, more preferably 14.0 to 16.5.

The constitutional unit having an SP value of 11.0 to 18.5 further improves the moisture absorbency of the modified polyvinyl acetal resin to reduce moisture absorption by the epoxy resin.

The SP value can be calculated using the "Fedors' estimation method" described in Hideki Yamamoto: SP-chi Kiso/Ouyou to Keisan-houhou [SP value: Foundation/Application and calculating method] (Johokiko Co., Ltd., 2005) pp. 66-67.

Examples of "the hydrogen-bonding group-containing constitutional unit" include amino group-, carboxyl group-, sulfonic acid group-, amide group-, phosphoric acid group-, pyrrolidone ring group-, and ethylene oxide group-containing constitutional units. Preferred among these are an amino group-containing constitutional unit and a carboxyl group-containing constitutional unit.

The hydrogen-bonding group-containing constitutional unit may have either a structure in which a hydrogen-bonding group as a side chain is directly bonded to a carbon atom constituting the main chain or a structure in which a hydrogen-bonding group is bonded to a carbon atom constituting the main chain via an alkylene group-containing structure.

The hydrogen-bonding group-containing constitutional unit may have either a steric structure in which two hydrogen-bonding groups are bonded to the same carbon atom constituting the main chain or a steric structure in which one hydrogen-bonding group is bonded to a carbon atom constituting the main chain. Alternatively, the hydrogen-bonding group-containing constitutional unit may have either a steric structure in which one hydrogen-bonding group is bonded to each of adjacent carbon atoms constituting the main chain or a steric structure in which a hydrogen-bonding group is bonded to either one of the adjacent carbon atoms constituting the main chain. A preferred structure is a steric structure in which two hydrogen-bonding groups are bonded to the same carbon atom constituting the main chain or a steric structure in which one hydrogen-bonding group is bonded to each of adjacent carbon atoms constituting the main chain.

The hydrogen-bonding group-containing constitutional unit may have either a steric structure having an isotactic arrangement of hydrogen-bonding groups bonded to carbon atoms constituting the main chain on the same side or a steric structure having a syndiotactic arrangement of hydrogen-bonding groups bonded to carbon atoms constituting the main chain at the opposite positions alternately along the chain. Moreover, it may have a steric structure having an atactic arrangement of randomly bonded hydrogen-bonding groups.

In the case where the hydrogen-bonding group-containing constitutional unit has a structure in which a hydrogen-bonding group is bonded to a carbon atom constituting the main chain via an alkylene group, the alkylene group is preferably a C1-C10 alkylene group, more preferably a C1-C5 alkylene group, still more preferably a C1-C3 alkylene group.

Examples of the C1-C10 alkylene group include linear alkylene groups, branched alkylene groups, and cyclic alkylene groups.

Examples of the linear alkylene groups include methylene, vinylene, n-propylene, tetramethylene, pentamethylene, hexamethylene, octamethylene, and decamethylene groups.

Examples of the branched alkylene groups include methyl methylene, methyl ethylene, 1-methyl pentylene, and 1,4-dimethyl butylene groups.

Examples of the cyclic alkylene groups include cyclopropylene, cyclobutylene, and cyclohexylene groups.

Preferred among these are linear alkylene groups, more preferred are methylene, vinylene, and n-propylene groups, and still more preferred are methylene and vinylene groups.

Examples of the carboxyl group-containing constitutional unit include a constitutional unit represented by the following formula (1-1), a constitutional unit represented by the following formula (1-2), a constitutional unit represented by the following formula (1-3), a constitutional unit represented by the following formula (1-4), and a constitutional unit represented by the following formula (1-5).

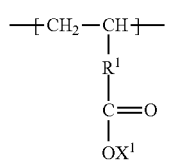

(1-1)

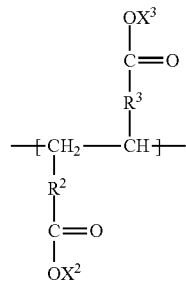

(1-2)

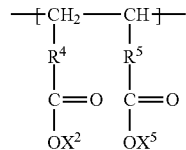

(1-3)

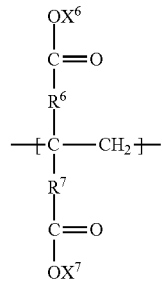

(1-4)

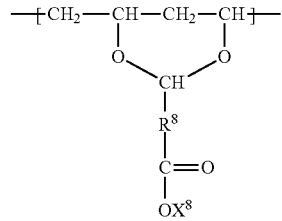

(1-5)

In the formula (1-1), $R^1$ represents a single bond or a C1-C10 alkylene group, and $X^1$ represents a hydrogen atom, a metal atom, or a methyl group.

$R^1$ is preferably a single bond or a C1-C5 alkylene group, more preferably a single bond or a C1-C3 alkylene group.

Examples of the C1-C10 alkylene group include linear alkylene groups, branched alkylene groups, and cyclic alkylene groups.

Examples of the linear alkylene groups include methylene, vinylene, n-propylene, tetramethylene, pentamethylene, hexamethylene, octamethylene, and decamethylene groups.

Examples of the branched alkylene groups include methyl methylene, methyl ethylene, 1-methyl pentylene, and 1,4-dimethyl butylene groups.

Examples of the cyclic alkylene group include cyclopropylene, cyclobutylene, and cyclohexylene groups.

Preferred among these are linear alkylene groups, more preferred are methylene, vinylene, and n-propylene groups, and still more preferred are methylene and vinylene groups.

Examples of the metal atom include sodium, lithium, and potassium atoms. Preferred among these is a sodium atom.

In the formula (1-2), $R^2$ and $R^3$ each independently represent a single bond or a C1-C10 alkylene group and $X^2$ and $X^3$ each independently represent a hydrogen atom, a metal atom, or a methyl group.

Examples of the C1-C10 alkylene group include those mentioned for $R^1$ in the formula (1-1).

Examples of the metal atom include those mentioned for $X^1$ in the formula (1-1).

In the formula (1-3), $R^4$ and $R^5$ each independently represent a single bond or a C1-C10 alkylene group and $X^4$ and $X^5$ each independently represent a hydrogen atom, a metal atom, or a methyl group.

Examples of the C1-C10 alkylene group include those mentioned for $R^1$ in the formula (1-1).

Examples of the metal atom include those mentioned for $X^1$ in the formula (1-1).

In the formula (1-4), $R^6$ and $R^7$ each independently represent a single bond or a C1-C10 alkylene group and $X^6$ and $X^7$ each independently represent a hydrogen atom, a metal atom, or a methyl group.

Examples of the C1-C10 alkylene group include those mentioned for $R^1$ in the formula (1-1).

Examples of the metal atom include those mentioned for $X^1$ in the formula (1-1).

In the formula (1-5), $R^8$ represents a single bond or a C1-C10 alkylene group and $X^8$ represents a hydrogen atom, a metal atom, or a methyl group.

Examples of the C1-C10 alkylene group include those mentioned for $R^1$ in the formula (1-1).

Examples of the metal atom include those mentioned for $X^1$ in the formula (1-1).

For better effect of capturing and absorbing moisture, the structure represented by the formula (1-3) or (1-4) is preferred, and the structure represented by the formula (1-3) is more preferred.

An example of the amino group-containing constitutional unit is a constitutional unit represented by the following formula (2).

[Chem. 2]

(2)

In the formula (2), $R^9$ represents a single bond or a C1-C10 alkylene group.

Examples of the C1-C10 alkylene group include those mentioned for $R^1$ in the formula (1-1).

An example of the sulfonic acid group-containing constitutional unit is a constitutional unit represented by the following formula (3).

[Chem. 3]

—(CH$_2$—CH)—
  |
  R$^{10}$
  |
  SO$_3$X$^9$ (3)

In the formula (3), $R^{10}$ represents a single bond or a C1-C10 alkylene group.

Examples of the C1-C10 alkylene group include those mentioned for $R^1$ in the formula (1-1).

In the formula (3), $X^9$ represents a hydrogen atom, a metal atom, or a methyl group.

Examples of the metal atom include those mentioned for $X^1$ in the formula (1-1).

An example of the ethylene oxide group-containing constitutional unit is a constitutional unit represented by the following formula (4).

[Chem. 4]

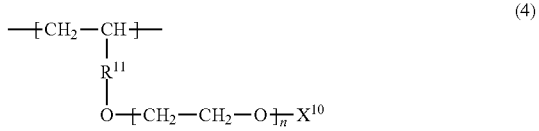

(4)

In the formula (4), $R^{11}$ represents a single bond or a C1-C10 alkylene group.

Examples of the C1-C10 alkylene group include those mentioned for $R^1$ in the formula (1-1).

In the formula (4), n represents an integer of 1 to 20 and $X^{10}$ represents a hydrogen atom, a metal atom, or a methyl group.

Examples of the metal atom include those mentioned for $X^1$ in the formula (1-1).

In the modified polyvinyl acetal resin, the lower limit of the amount of the hydrogen-bonding group-containing constitutional unit (hereafter, also referred to as a hydrogen-bonding group content) is preferably 5.1 mol % and the upper limit thereof is preferably 30.0 mol %.

When the hydrogen-bonding group content is 5.1 mol % or higher, the modified polyvinyl acetal resin can exhibit high moisture absorbency in a high-temperature environment to reduce reduction in curability of the epoxy resin composition. When the hydrogen-bonding group content is 30.0 mol % or lower, the storage stability can be improved. The lower limit of the hydrogen-bonding group content is more preferably 5.5 mol % and the upper limit thereof is more preferably 15.0 mol %. The hydrogen-bonding group content can be measured by NMR.

The lower limit of the number of the hydrogen-bonding groups in the molecule of the modified polyvinyl acetal resin is preferably 7.0, more preferably 112.5, still more preferably 121.5 and the upper limit thereof is preferably 648.0, more preferably 329.0.

The number of the hydrogen-bonding groups in the molecule of the modified polyvinyl acetal resin can be calculated based on the average degree of polymerization of the modified polyvinyl acetal resin, the amount of the hydrogen-bonding group-containing constitutional unit, and the number of the hydrogen-bonding groups in the hydrogen-bonding group-containing constitutional unit.

The modified polyvinyl acetal resin has an acetal group-containing constitutional unit represented by the following formula (5-1), a hydroxyl group-containing constitutional unit represented by the following formula (5-2), and an acetyl group-containing constitutional unit represented by the following formula (5-3).

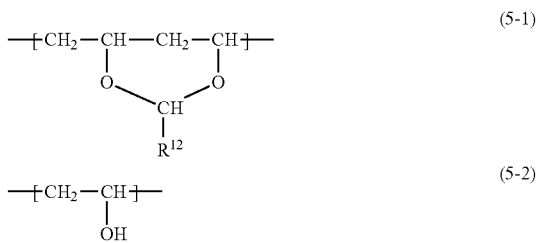

-continued

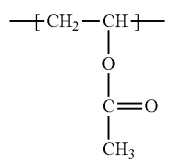
(5-3)

In the formula (5-1), $R^{12}$ represents a hydrogen atom or a C1-C20 alkyl group.

$R^{12}$ is preferably a hydrogen atom or a C1-C12 alkyl group.

Examples of the C1-C20 alkyl group include methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, and eicosyl groups. Preferred among these are methyl, ethyl, and propyl groups.

In the modified polyvinyl acetal resin, the lower limit of the amount of the acetal group-containing constitutional unit (hereafter, also referred to as acetal group content) is 35.0 mol % and the upper limit thereof is preferably 85.0 mol %. When the acetal group content is 35.0 mol % or higher, the modified polyvinyl acetal resin can be sufficiently precipitated in the synthesis process. When the acetal group content is 85.0 mol % or lower, the dispersibility of the modified polyvinyl acetal resin in an epoxy resin can be improved. The lower limit of the acetal group content is more preferably 38.0 mol % and the upper limit thereof is more preferably 72.0 mol %.

In the modified polyvinyl acetal resin, the lower limit of the amount of the hydroxyl group-containing constitutional unit (hereafter, also referred to as hydroxyl group content) is preferably 10.0 mol % and the upper limit thereof is preferably 50.0 mol %. When the hydroxyl group content is 10.0 mol % or higher, the toughness of the modified polyvinyl acetal resin is sufficiently high, leading to favorable strength of the resulting crosslinked product. When the hydroxyl group content is 50.0 mol % or lower, the polarity of the modified polyvinyl acetal resin is not too high, so that troubles such as cracking in the resulting crosslinked product are reduced to achieve favorable peeling properties. The lower limit of the hydroxyl group content is more preferably 20.0 mol % and the upper limit thereof is more preferably 45.0 mol %.

In the modified polyvinyl acetal resin, the lower limit of the amount of the acetyl group-containing constitutional unit (hereafter, also referred to as acetyl group content) is preferably 0.1 mol % and the upper limit thereof is preferably 20.0 mol %. When the acetyl group content is 0.1 mol % or higher, an increase in viscosity when the modified polyvinyl acetal resin is added to an epoxy resin can be reduced. When the acetyl group content is 20.0 mol % or lower, the modified polyvinyl acetal resin has favorable dispersibility in an epoxy resin. The lower limit of the acetyl group content is more preferably 0.5 mol % and the upper limit thereof is more preferably 10.0 mol %.

In the modified polyvinyl acetal resin, the lower limit of the total of the hydroxyl group content and the hydrogen-bonding group content is preferably 15.1 mol % and the upper limit thereof is preferably 65.0 mol %. When the total amount is 15.1 mol % or more, the resulting adhesive has favorable moisture resistance and favorable adhesion retention. When the total amount is 65.0 mol % or less, the modified polyvinyl acetal resin has favorable dispersibility in an epoxy resin and favorable moisture resistance. The lower limit of the total amount is more preferably 25.1 mol % and the upper limit thereof is more preferably 60.0 mol %.

The lower limit of the average degree of polymerization of the modified polyvinyl acetal resin is preferably 150 and the upper limit thereof is preferably 6,000. When the modified polyvinyl acetal resin has a degree of polymerization of 150 or more, the resulting epoxy resin composition has sufficient viscosity. When the modified polyvinyl acetal resin has a degree of polymerization of 6,000 or less, the application properties of the resulting epoxy resin composition are favorable in the use where the composition is applied, resulting in better handleability. Moreover, the adhesion is further improved.

The lower limit of the average degree of polymerization is more preferably 400 and the upper limit thereof is more preferably 4,000.

The lower limit of the equilibrium moisture absorption of the modified polyvinyl acetal resin is 5% by weight and the upper limit thereof is 20% by weight. The equilibrium moisture absorption refers to a moisture content of the modified polyvinyl acetal resin measured after drying the modified polyvinyl acetal resin in a vacuum oven to a moisture content of 0.5% by weight or lower and then leaving the modified polyvinyl acetal resin at 40° C. and 90% RH for seven days.

When the equilibrium moisture absorption of the modified polyvinyl acetal resin is 5% by weight or higher, the adhesion retention of the resulting epoxy resin composition in a high-temperature high-humidity environment can be improved. When the equilibrium moisture absorption of the modified polyvinyl acetal resin is 20% by weight or lower, curing inhibition of the epoxy resin is not likely to occur, reducing peeling and reduction in shear adhesion. The lower limit of the equilibrium moisture absorption is preferably 7.0% by weight, more preferably 10.0% by weight and the upper limit thereof is preferably 15.0% by weight.

The equilibrium moisture absorption of the modified polyvinyl acetal resin can be controlled, for example, by adjusting the mole ratio between a hydrophilic unit and a hydrophobic unit in the modified polyvinyl acetal resin and the reaction time.

The hydrophilic unit herein refers to the hydroxyl group-containing constitutional unit and a hydrogen-bonding group-containing constitutional unit having an SP value of 11.0 to 18.5. The hydrophobic unit herein refers to the acetal group-containing constitutional unit, the acetyl group-containing constitutional unit, and a modified group-containing constitutional unit having an SP value of less than 11.0.

The lower limit of the mole ratio (hydrophilic unit/hydrophobic unit) between the hydrophilic unit and the hydrophobic unit in the modified polyvinyl acetal resin is preferably 0.35 and the upper limit thereof is preferably 0.50.

The lower limit of the speed of moisture absorption of the modified polyvinyl acetal resin is preferably 0.0020 g/g/h, more preferably 0.0034 g/g/h, still more preferably 0.0050 g/g/h and the upper limit thereof is preferably 0.0120 g/g/h, more preferably 0.0080 g/g/h.

The speed of moisture absorption refers to the amount (g) of moisture absorbed per hour by 1 g of the modified polyvinyl acetal resin up to the moment when the moisture absorption reaches a state of equilibrium. The speed of moisture absorption can be calculated using a modified polyvinyl acetal resin dried in a vacuum oven to a moisture content of 0.5% by weight or lower and left at 40° C. and 90% RH, based on the time (h) to reach the equilibrium moisture absorption and the amount (g/g) of moisture absorbed by 1 g of the modified polyvinyl acetal resin when the equilibrium moisture absorption is achieved.

When the modified polyvinyl acetal resin is dissolved in a solvent mixture containing ethanol and toluene at a ratio of 1:1 to prepare a 5% by weight solution and the viscosity of the solution is measured with a B-type viscometer under the condition of the solution temperature of 20° C., the lower limit of the viscosity is preferably 10.0 mPa·s and the upper limit thereof is preferably 500.0 mPa·s.

When the modified polyvinyl acetal resin is formed into a film, the lower limit of the tensile elasticity is preferably 800 N/mm$^2$ and the upper limit thereof is preferably 2,000 N/mm$^2$.

The tensile elasticity can be measured by a tensile test at 25° C. and a tensile speed of 10 mm/min, for example.

Examples of the method for producing the modified polyvinyl acetal resin include a method including copolymerizing a hydrogen-bonding group-containing monomer and vinyl acetate to prepare polyvinyl acetate, saponifying the polyvinyl acetate to prepare polyvinyl alcohol, and acetalizing the polyvinyl alcohol by a conventionally known method. A hydrogen-bonding group may be introduced by post modification of a polyvinyl acetal resin that is prepared by acetalizing unmodified polyvinyl alcohol by a conventionally known method.

In other words, the modified polyvinyl acetal resin may be either an acetalization product of hydrogen-bonding group-containing polyvinyl alcohol or a product obtained by introducing a hydrogen-bonding group into an acetalization product of unmodified polyvinyl alcohol.

Examples of the hydrogen bonding group-containing monomer include monocarboxylic acids such as acrylic acid, crotonic acid, methacrylic acid, and oleic acid, dicarboxylic acids such as methylene malonic acid, itaconic acid, 2-methylene glutaric acid, 2-methylene adipic acid, and 2-methylene sebacic acid, maleic anhydride, and metal salts of these.

The acetalization may be carried out by a known method, and is preferably carried out in a water solvent, a solvent mixture containing water and an organic solvent compatible with water, or an organic solvent.

The organic solvent compatible with water may be, for example, an alcoholic organic solvent.

Examples of the organic solvent include alcoholic organic solvents, aromatic organic solvents, aliphatic ester solvents, ketone solvents, lower paraffin solvents, ether solvents, and amine solvents.

Examples of the alcoholic organic solvents include methanol, ethanol, n-propanol, isopropanol, n-butanol, and tert-butanol.

Examples of the aromatic organic solvent include xylene, toluene, ethyl benzene, and methyl benzoate.

Examples of the aliphatic ester solvents include methyl acetate, ethyl acetate, butyl acetate, methyl propionate, ethyl propionate, methyl butyrate, ethyl butyrate, methyl acetoacetate, and ethyl acetoacetate.

Examples of the ketone solvents include acetone, methyl ethyl ketone, methyl isobutyl ketone, cyclohexanone, methyl cyclohexanone, benzophenone, and acetophenone.

Examples of the lower paraffin solvents include hexane, pentane, octane, cyclohexane, and decane.

Examples of the ether solvents include diethyl ether, tetrahydrofuran, ethylene glycol dimethyl ether, ethylene glycol diethyl ether, and propylene glycol diethyl ether.

Examples of the amide solvents include N,N-dimethylformamide, N,N-dimethylacetamide, N-methylpyrrolidone, and acetanilide.

Examples of the amine solvents include ammonia, trimethylamine, triethylamine, n-butylamine, di-n-butylamine, tri-n-butylamine, aniline, N-methylaniline, N,N-dimethylaniline, and pyridine.

These may be used alone or in admixture of two or more thereof. From the standpoint of solubility in resin and easy purification, particularly preferred among these are ethanol, n-propanol, isopropanol, and tetrahydrofuran.

The acetalization is preferably carried out in the presence of an acid catalyst.

The acid catalyst is not limited, and examples thereof include mineral acids such as sulfuric acid, hydrochloric acid, nitric acid, and phosphoric acid, carboxylic acids such as formic acid, acetic acid, and propionic acid, and sulfonic acids such as methanesulfonic acid, ethanesulfonic acid, benzenesulfonic acid, and p-toluene sulfonic acid. These acid catalysts may be used alone, or two or more types of compounds may be used in combination. Preferred among these are hydrochloric acid, nitric acid, and sulfuric acid, and particularly preferred is hydrochloric acid.

The aldehyde used for the acetalization may be an aldehyde containing a C1-C10 chain aliphatic group, a C1-C10 cyclic aliphatic group, or a C1-C10 aromatic group. The aldehyde used may be a conventionally known aldehyde. The aldehyde used for the acetalization is not limited, and examples thereof include aliphatic aldehydes and aromatic aldehydes.

Examples of the aliphatic aldehydes include formaldehyde, acetaldehyde, propionaldehyde, n-butyraldehyde, isobutyraldehyde, n-valeraldehyde, n-hexylaldehyde, 2-ethylbutyraldehyde, 2-ethylhexylaldehyde, n-heptylaldehyde, n-octylaldehyde, n-nonylaldehyde, n-decylaldehyde, and amylaldehyde.

Examples of the aromatic aldehydes include benzaldehyde, cinnamaldehyde, 2-methylbenzaldehyde, 3-methylbenzaldehyde, 4-methylbenzaldehyde, p-hydroxybenzaldehyde, m-hydroxybenzaldehyde, phenylacetaldehyde, and β-phenylpropionaldehyde.

These aldehydes may be used alone, or two or more types thereof may be used in combination. Preferred among these aldehydes are formaldehyde, acetaldehyde, butyraldehyde, 2-ethylhexylaldehyde, and n-nonylaldehyde because they are excellent in acetalization reactivity and can give the resin to be prepared a sufficient internal plasticization effect to impart favorable flexibility. More preferred are formaldehyde, acetaldehyde, and butyraldehyde because they can provide a resin composition particularly excellent in impact resistance and adhesiveness to metal.

The amount of the aldehyde can be appropriately determined in accordance with the acetal group content of the aimed modified polyvinyl acetal resin. The amount of the aldehyde may be appropriately determined in accordance with the acetal group content of the aimed modified polyvinyl acetal resin. In particular, the amount is set to 60 to 95 mol %, preferably 65 to 90 mol % relative to 100 mol % of the polyvinyl alcohol for an efficient acetalization reaction and easy removal of an unreacted aldehyde.

In the epoxy resin composition of the present invention, the lower limit of the amount of the modified polyvinyl acetal resin is preferably 0.5% by weight and the upper limit thereof is preferably 50% by weight.

When the amount of the modified polyvinyl acetal resin is 0.5% by weight or more, high toughness can be exhibited when the epoxy resin composition of the present invention is used as an adhesive. Moreover, the modified polyvinyl acetal resin can exhibit high moisture absorbency to reduce moisture absorption by the epoxy resin, thereby reducing reduction in curing reactivity. When the amount is 50% by weight or less, high adhesiveness can be exhibited.

The lower limit of the amount of the modified polyvinyl acetal resin is more preferably 1.0% by weight, still more preferably 10% by weight and the upper limit thereof is more preferably 40% by weight, still more preferably 30% by weight.

The epoxy resin composition of the present invention contains an epoxy resin.

Incorporation of the epoxy resin enables crosslinking under application of energy by heating or the like, realizing high adhesiveness.

Examples of the epoxy resin include aromatic epoxy resins, heterocyclic epoxy resins, and aliphatic epoxy resins.

Examples of the aromatic epoxy resins include glycidyl ethers and glycidyl esters of polyphenols and glycidyl aromatic polyamines.

Examples of the glycidyl ethers of polyphenols include bisphenol A-type epoxy resins, bisphenol F-type epoxy resins, and phenol novolac-type epoxy resins.

Examples of the glycidyl esters of polyphenols include diglycidyl phthalate, diglycidyl isophthalate, and diglycidyl terephthalate.

Examples of the glycidyl aromatic polyamines include N,N-diglycidyl aniline, N,N,N',N'-tetraglycidyl xylylenediamine, and N,N,N',N'-tetraglycidyl diphenylmethane diamine.

Examples of the heterocyclic epoxy resins include triglycidyl isocyanate and triglycidyl melamine.

Examples of the aliphatic epoxy resins include glycidyl ethers of aliphatic alcohols and glycidyl esters of polyhydric fatty acids.

Examples of the glycidyl ethers of aliphatic alcohols include butyl glycidyl ether, lauryl glycidyl ether, neopentyl glycol diglycidyl ether, propylene glycol diglycidyl ether, and polypropylene glycol diglycidyl ether.

Examples of the glycidyl esters of polyhydric fatty acids include diglycidyl oxalate, diglycidyl maleate, diglycidyl succinate, diglycidyl glutarate, diglycidyl adipate, and diglycidyl pimelate.

One type of the epoxy resin may be used alone or two or more types thereof may be used in combination. From the standpoint of improving the adhesion, an aromatic epoxy resin is preferably used among these epoxy resins, and a combination of an aromatic epoxy resin and an aliphatic epoxy resin is more preferably used.

The lower limit of the epoxy equivalent (molecular weight per epoxy group) of the epoxy resin is preferably 90 and the upper limit thereof is preferably 700.

When the epoxy equivalent is not less than the preferable lower limit, curing failure is not likely to occur, leading to sufficient improvement of the mechanical strength. When the epoxy equivalent is not more than the preferable upper limit, the molecular weight between crosslinking points is lowered, leading to improvement of heat resistance.

The lower limit of the epoxy equivalent is more preferably 100 and the upper limit thereof is more preferably 600.

The lower limit of the molecular weight of the epoxy resin is preferably 100 and the upper limit thereof is preferably 5,500.

When the molecular weight is 100 or more, the mechanical strength and heat resistance of the crosslinked product can be sufficiently improved. When the molecular weight is 5,500 or less, the crosslinked product is not too rigid and has sufficient strength.

The molecular weight is more preferably 200 to 1,000.

In the epoxy resin composition of the present invention, the lower limit of the amount of the epoxy resin is preferably 0.5% by weight, and the upper limit thereof is preferably 99.5% by weight.

When the amount of the epoxy resin is 0.5% by weight or more, the adhesiveness of the epoxy resin composition can be further improved. When the amount of the epoxy resin is 99.5% by weight or less, the toughness of the epoxy resin composition can be improved.

The lower limit of the amount of the epoxy resin is more preferably 1.0% by weight and the upper limit thereof is more preferably 90.0% by weight.

In the epoxy resin composition of the present invention, the lower limit of the amount of the modified polyvinyl acetal resin per 100 parts by weight of the epoxy resin is preferably 0.1 parts by weight and the upper limit thereof is preferably 50 parts by weight.

When the amount of the modified polyvinyl acetal resin is 0.1 parts by weight or more, the toughness of the epoxy resin composition is sufficient. When the amount of the modified polyvinyl acetal resin is 50 parts by weight or less, the adhesiveness is sufficient.

The lower limit of the amount of the modified polyvinyl acetal resin is more preferably 5 parts by weight and the upper limit thereof is more preferably 30 parts by weight.

In the epoxy resin composition of the present invention, the lower limit of the ratio of the total of the number of hydroxyl groups and the number of hydrogen-bonding groups in the modified polyvinyl acetal resin to the number of epoxy groups in the epoxy resin (number of hydroxyl groups+number of hydrogen-bonding groups/number of epoxy groups) is preferably 0.01, more preferably 0.10 and the upper limit thereof is preferably 1.00, more preferably 0.50. When the ratio of the total number of hydroxyl groups and hydrogen-bonding groups to the number of epoxy groups is not lower than the preferable lower limit and not higher than the preferably upper limit, the modified polyvinyl acetal resin exhibits sufficient moisture absorbency to sufficiently reduce reduction in reactivity of the epoxy resin in a curing reaction.

"The number of hydroxyl groups" and "the number of hydrogen-bonding groups" can be calculated based on the amount and molecular weight of the modified polyvinyl acetal resin and the numbers of hydroxyl groups and hydrogen-bonding groups per mole of the modified polyvinyl acetal resin. The molecular weight of the modified polyvinyl acetal resin can be calculated based on the degree of polymerization of the modified polyvinyl acetal resin, the amount of each constitutional unit, and the molecular weight of each constitutional unit.

"The number of epoxy groups" can be calculated based on the amount and epoxy equivalent of the epoxy resin.

In the epoxy resin composition of the present invention, the lower limit of the ratio of the number of hydrogen-bonding groups in the modified polyvinyl acetal resin to the number of epoxy groups in the epoxy resin (number of hydrogen-bonding groups/number of epoxy groups) is preferably 0.025, more preferably 0.05 and the upper limit thereof is preferably 0.50, more preferably 0.30. When the ratio of the number of hydrogen-bonding groups to the number of epoxy groups is not lower than the preferable lower limit and not higher than the preferable upper limit, the modified polyvinyl acetal resin can exhibit sufficient moisture absorbency to sufficiently reduce reduction in reactivity of the epoxy resin in a curing reaction.

In the epoxy resin composition of the present invention, the amount of the organic solvent is preferably 10.0% by weight or less but 0% by weight or more.

When the amount of the organic solvent is 10.0% by weight or less, curing inhibition is not likely to occur.

Examples of the organic solvent include conventionally known various organic solvents such as alcohols, ketones, acetic acid esters, carbitols, and aromatic hydrocarbons, as well as dimethylformamide, dimethylacetamide, and N-methylpyrrolidone.

Examples of the alcohols include methanol, ethanol, and isopropyl alcohol.

Examples of the ketones include acetone, methyl ethyl ketone, and cyclohexanone.

Examples of the acetic acid esters include ethyl acetate, butyl acetate, cellosolve acetate, propylene glycol monomethyl ether acetate, and carbitol acetate.

Examples of the carbitols include cellosolves such as cellosolve and butyl cellosolve, carbitol, and butyl carbitol.

Examples of the aromatic hydrocarbons include toluene and xylene.

The epoxy resin composition of the present invention may contain a crosslinking agent in addition to the modified polyvinyl acetal resin and the epoxy resin.

Examples of the crosslinking agent include halohydrin compounds, halogen compounds, isocyanate compounds, bisacrylamide compounds, urea compounds, guanidine compounds, dicarboxylic acid compounds, unsaturated carboxylic acid compounds, unsaturated carboxylic acid ester compounds, and aldehyde compounds.

Examples of the halohydrin compounds include epichlorohydrin and epibromohydrin.

Examples of the halogen compounds include 1,2-dichloroethane and 1,3-dichloropropane.

Examples of the isocyanate compounds include hexamethylene diisocyanate.

Examples of the bisacrylamide compounds include N,N'-methylenebisacrylamide and N,N'-ethylenebisacrylamide.

Examples of the urea compounds include urea and thiourea.

Examples of the guanidine compounds include guanidine and diguanide.

Examples of the dicarboxylic acid compounds include oxalic acid and adipic acid.

Examples of the unsaturated carboxylic acid compounds include acrylic acid and methacrylic acid.

Examples of the unsaturated carboxylic acid ester compounds include methyl acrylate, methyl methacrylate, 2-ethylhexyl acrylate, isobutyl acrylate, butyl acrylate, 2-ethylhexyl methacrylate, isobutyl methacrylate, and butyl methacrylate.

Examples of the aldehyde compounds include dialdehydes such as glyoxal, glutaraldehyde, malonaldehyde, succinaldehyde, adipaldehyde, phthalaldehyde, isophthalaldehyde, and terephthalaldehyde.

These may be used alone or in combination of two or more. These crosslinking agents may be dissolved in water or an organic solvent such as alcohol before use.

The epoxy resin composition of the present invention may further contain a curing agent and a curing accelerator.

Examples of the curing agent include dicyandiamide, imidazole compounds, aromatic amine compounds, phenol novolac resins, and cresol novolac resins. Preferred among these is dicyandiamide.

Examples of the curing accelerator include imidazole compounds, phosphorus compounds, amine compounds, and organic metallic compounds. Preferred among these are imidazole compounds.

The lower limit of the amount of the curing agent in the epoxy resin composition of the present invention per 100 parts by weight of the epoxy resin is preferably 0.5 parts by weight, more preferably 1.0 part by weight and the upper limit thereof is preferably 100 parts by weight, more preferably 50 parts by weight.

The lower limit of the amount of the curing accelerator in the epoxy resin composition of the present invention per 100 parts by weight of the epoxy resin is preferably 0.5 parts by weight, more preferably 1.0 part by weight and the upper limit thereof is preferably 30 parts by weight, more preferably 10 parts by weight.

In the epoxy resin composition of the present invention, the lower limit of the ratio of the amount of the curing agent to the amount of the curing accelerator (amount of curing agent/amount of curing accelerator) is preferably 1/18, more preferably 1/8 and the upper limit thereof is preferably 1/0.05, more preferably 1/0.125.

The epoxy resin composition of the present invention may further contain an inorganic filler.

Examples of the inorganic filler include: metal hydroxides and metal oxides such as aluminum hydroxide, magnesium hydroxide, calcium oxide, magnesium oxide, aluminum oxide, zinc oxide, titanium oxide, and antimony oxide; metallic powders such as zinc powder; metallic carbonates such as calcium carbonate, magnesium carbonate, barium carbonate, and zinc carbonate; calcium sulfate; barium sulfate; calcium silicate; mica; talc; bentonite; zeolite; silica gel; aluminum oxide; and glass powder.

The lower limit of the amount of the inorganic filler in the epoxy resin composition of the present invention per 100 parts by weight of the epoxy resin is preferably 1 part by weight, more preferably 5 parts by weight and the upper limit thereof is preferably 30 parts by weight, more preferably 15 parts by weight.

The epoxy resin composition of the present invention may contain additives such as a plasticizer and a dispersant within a range that the effects of the present invention are not impaired.

The epoxy resin composition of the present invention may be crosslinked, for example, by heating. In the case of thermally curing the epoxy resin composition by heating, the heating temperature is not limited and is preferably 50° C. to 170° C. With the heating temperature of 50° C. or higher, crosslinking can proceed sufficiently to give favorable strength. With the heating temperature of 170° C. or lower, the modified polyvinyl acetal resin is not thermally degraded to show its properties sufficiently. The lower limit of the heating temperature is more preferably 60° C. and the upper limit thereof is more preferably 150° C.

Though not particularly limited, the lower limit of heating duration is preferably 5 minutes and the upper limit thereof is preferably 10 hours. With the heating duration of 5 minutes or longer, crosslinking can proceed sufficiently to give sufficient strength. With the heating duration of 10 hours or shorter, the modified polyvinyl acetal resin is not thermally degraded to show its properties sufficiently.

The epoxy resin composition of the present invention can be suitably used for applications in which conventional polyvinyl acetal resins have been used. For example, it can be used to obtain coating solutions for producing ceramic molded articles, metal pastes, heat-developing photosensitive materials, coating materials, ink, and reflective sheets.

The epoxy resin composition of the present invention can be also used as an adhesive such as an adhesive for films used in display devices, an interlayer adhesive for ceramic laminates, and a structural adhesive for automobiles and buildings.

Advantageous Effects of Invention

The present invention can provide an epoxy resin composition capable of exhibiting high moisture resistance and reducing reduction in adhesion at high temperature and high humidity.

DESCRIPTION OF EMBODIMENTS

The present invention is more specifically described in the following with reference to, but not limited to, examples.

Example 1

(Preparation of Modified Polyvinyl Acetal Resin)

An amount of 200 g of polyvinyl alcohol was added to 1,800 g of pure water, and stirred at 90° C. for about two hours to be dissolved. The solution was cooled to 40° C., and to the solution were added 150 g of hydrochloric acid having a concentration of 35% by weight and 75 g of acetaldehyde. The acetalization was carried out by maintaining the solution temperature at 40° C. to precipitate a reaction product.

The polyvinyl alcohol used had an average degree of polymerization of 2,500 and a degree of saponification of 97.9 mol %, and contained 5.1 mol % of a carboxyl group-containing constitutional unit represented by the formula (1-4) (in the formula (1-4), $R^6$ represents a single bond, $X^6$ represents a hydrogen atom, $R^7$ represents a methylene group, and $X^7$ represents a hydrogen atom, SP value of the constitutional unit: 15.1).

Then, the reaction solution was held to maintain the temperature at 40° C. for three hours, thereby completing the reaction. The resulting solution was subjected to neutralization, washing with water, and drying by normal methods, whereby a modified polyvinyl acetal resin powder was obtained.

The obtained modified polyvinyl acetal resin was dissolved in dimethylsulfoxide (DMSO-$D_6$), and analyzed by $^{13}$C-NMR (nuclear magnetic resonance spectrum) to confirm the presence of the carboxyl group-containing constitutional unit represented by the formula (1-4) (amount: 5.1 mol %).

Table 1 shows the acetal group content, the acetyl group content, and the hydroxyl group content measured by $^{13}$C-NMR.

An amount of 20 parts by weight of the obtained modified polyvinyl acetal resin, 100 parts by weight of an epoxy resin, 3 parts by weight of a curing agent, 2 parts by weight of a curing accelerator, and 10 parts by weight of an inorganic filler were mixed to prepare an epoxy resin composition.

The epoxy resin, curing agent, curing accelerator, and inorganic filler used are listed below.

Epoxy resin: Bisphenol A-type epoxy resin (jER 828 available from Mitsubishi Chemical Corporation, epoxy equivalent: 190, molecular weight: 370)

Propylene glycol diglycidyl ether (DENACOL EX-920 available from Nagase ChemteX Corporation, epoxy equivalent: 176, molecular weight: 350)

Curing agent: Dicyandiamide (DICY7 available from Mitsubishi Chemical Corporation)

Curing accelerator: Imidazole compound (jERCURE EMI24 available from Mitsubishi Chemical Corporation)

Inorganic filler: Calcium carbonate

Example 2

(Preparation of Modified Polyvinyl Acetal Resin)

An amount of 200 g of polyvinyl alcohol was added to 1,800 g of pure water, and stirred at 90° C. for about two hours to be dissolved. The solution was cooled to 40° C., and to the solution were added 150 g of hydrochloric acid having a concentration of 35% by weight and 75 g of acetaldehyde. The acetalization was carried out by maintaining the solution temperature at 40° C. to precipitate a reaction product.

The polyvinyl alcohol used had an average degree of polymerization of 2,500 and a degree of saponification of 97.9 mol %, and contained 25.0 mol % of a carboxyl group-containing constitutional unit represented by the formula (1-4) (in the formula (1-4), $R^6$ represents a single bond, $X^6$ represents a hydrogen atom, $R^7$ represents a methylene group, and $X^7$ represents a hydrogen atom, SP value of the constitutional unit: 15.1).

Then, the reaction solution was held to maintain the temperature at 40° C. for three hours, thereby completing the reaction. The resulting solution was subjected to neutralization, washing with water, and drying by normal methods, whereby a modified polyvinyl acetal resin powder was obtained.

The obtained modified polyvinyl acetal resin was dissolved in dimethylsulfoxide (DMSO-$D_6$), and analyzed by $^{13}$C-NMR (nuclear magnetic resonance spectrum) to confirm the presence of the carboxyl group-containing constitutional unit represented by the formula (1-4) (amount: 25.0 mol %).

Table 1 shows the acetal group content, the acetyl group content, and the hydroxyl group content measured by $^{13}$C-NMR.

An epoxy resin composition was prepared as in Example 1, except that the obtained modified polyvinyl acetal resin was used.

Example 3

(Preparation of Modified Polyvinyl Acetal Resin)

An amount of 200 g of polyvinyl alcohol was added to 1,800 g of pure water, and stirred at 90° C. for about two hours to be dissolved. The solution was cooled to 40° C., and to the solution were added 150 g of hydrochloric acid having a concentration of 35% by weight and 75 g of acetaldehyde. The acetalization was carried out by maintaining the solution temperature at 40° C. to precipitate a reaction product.

The polyvinyl alcohol used had an average degree of polymerization of 2,500 and a degree of saponification of 97.9 mol %, and contained 10.0 mol % of a carboxyl group-containing constitutional unit represented by the formula (1-4) (in the formula (1-4), $R^6$ represents a single bond, $X^6$ represents a hydrogen atom, $R^7$ represents a methylene group, and $X^7$ represents a hydrogen atom, SP value of the constitutional unit: 15.1).

Then, the reaction solution was held to maintain the temperature at 40° C. for three hours, thereby completing the reaction. The resulting solution was subjected to neutralization, washing with water, and drying by normal methods, whereby a modified polyvinyl acetal resin powder was obtained.

The obtained modified polyvinyl acetal resin was dissolved in dimethylsulfoxide (DMSO-$D_6$), and analyzed by $^{13}$C-NMR (nuclear magnetic resonance spectrum) to confirm the presence of the carboxyl group-containing constitutional unit represented by the formula (1-4) (amount: 10.0 mol %).

Table 1 shows the acetal group content, the acetyl group content, and the hydroxyl group content measured by C-NMR.

An epoxy resin composition was prepared as in Example 1, except that the obtained modified polyvinyl acetal resin was used.

Example 4

(Preparation of Modified Polyvinyl Acetal Resin)

An amount of 200 g of polyvinyl alcohol was added to 1,800 g of pure water, and stirred at 90° C. for about two hours to be dissolved. The solution was cooled to 40° C., and to the solution were added 150 g of hydrochloric acid having a concentration of 35% by weight and 60 g of acetaldehyde. The acetalization was carried out by maintaining the solution temperature at 40° C. to precipitate a reaction product.

The polyvinyl alcohol used had an average degree of polymerization of 2,500 and a degree of saponification of 97.9 mol %, and contained 7.0 mol % of a carboxyl group-containing constitutional unit represented by the formula (1-4) (in the formula (1-4), $R^6$ represents a single bond, $X^6$ represents a hydrogen atom, $R^7$ represents a methylene group, and $X^7$ represents a hydrogen atom, SP value of the constitutional unit: 15.1).

Then, the reaction solution was held to maintain the temperature at 40° C. for three hours, thereby completing the reaction. The resulting solution was subjected to neutralization, washing with water, and drying by normal methods, whereby a modified polyvinyl acetal resin powder was obtained.

The obtained modified polyvinyl acetal resin was dissolved in dimethylsulfoxide (DMSO-$D_6$), and analyzed by $^{13}$C-NMR (nuclear magnetic resonance spectrum) to confirm the presence of the carboxyl group-containing constitutional unit represented by the formula (1-4) (amount: 7.0 mol %).

Table 1 shows the acetal group content, the acetyl group content, and the hydroxyl group content measured by $^{13}$C-NMR.

An epoxy resin composition was prepared as in Example 1, except that the obtained modified polyvinyl acetal resin was used.

Example 5

(Preparation of Modified Polyvinyl Acetal Resin)

An amount of 200 g of polyvinyl alcohol was added to 1,800 g of pure water, and stirred at 90° C. for about two hours to be dissolved. The solution was cooled to 40° C., and to the solution were added 150 g of hydrochloric acid having a concentration of 35% by weight and 75 g of acetaldehyde. The acetalization was carried out by maintaining the solution temperature at 40° C. to precipitate a reaction product.

The polyvinyl alcohol used had an average degree of polymerization of 2,500 and a degree of saponification of 97.9 mol %, and contained 5.5 mol % of a carboxyl group-containing constitutional unit represented by the formula (1-5) (in the formula (1-5), $R^8$ represents a single bond and $X^8$ represents a hydrogen atom, SP value of the constitutional unit: 14.1).

Then, the reaction solution was held to maintain the temperature at 40° C. for three hours, thereby completing the reaction. The resulting solution was subjected to neutralization, washing with water, and drying by normal methods, whereby a modified polyvinyl acetal resin powder was obtained.

The obtained modified polyvinyl acetal resin was dissolved in dimethylsulfoxide (DMSO-$D_6$), and analyzed by $^{13}$C-NMR (nuclear magnetic resonance spectrum) to confirm the presence of the carboxyl group-containing constitutional unit represented by the formula (1-5) (amount: 5.5 mol %).

Table 1 shows the acetal group content, the acetyl group content, and the hydroxyl group content measured by $^{13}$C-NMR.

An epoxy resin composition was prepared as in Example 1, except that the obtained modified polyvinyl acetal resin was used.

Example 6

(Preparation of Modified Polyvinyl Acetal Resin)

An amount of 200 g of polyvinyl alcohol was added to 1,800 g of pure water, and stirred at 90° C. for about two hours to be dissolved. The solution was cooled to 40° C., and to the solution were added 150 g of hydrochloric acid having a concentration of 35% by weight and 75 g of acetaldehyde. The acetalization was carried out by maintaining the solution temperature at 40° C. to precipitate a reaction product.

The polyvinyl alcohol used had an average degree of polymerization of 2,500 and a degree of saponification of 97.9 mol %, and contained 5.5 mol % of an amino group-containing constitutional unit represented by the formula (2) (in the formula (2), $R^9$ represents a single bond, SP value of the constitutional unit: 12.1).

Then, the reaction solution was held to maintain the temperature at 40° C. for three hours, thereby completing the reaction. The resulting solution was subjected to neutralization, washing with water, and drying by normal methods, whereby a modified polyvinyl acetal resin powder was obtained.

The obtained modified polyvinyl acetal resin was dissolved in dimethylsulfoxide (DMSO-$D_6$), and analyzed by $^{13}$C-NMR (nuclear magnetic resonance spectrum) to confirm the presence of the amino group-containing constitutional unit represented by the formula (2) (amount: 5.5 mol %).

Table 1 shows the acetal group content, the acetyl group content, and the hydroxyl group content measured by $^{13}$C-NMR.

An epoxy resin composition was prepared as in Example 1, except that the obtained modified polyvinyl acetal resin was used.

Example 7

(Preparation of Modified Polyvinyl Acetal Resin)

An amount of 200 g of polyvinyl alcohol was added to 1,800 g of pure water, and stirred at 90° C. for about two hours to be dissolved. The solution was cooled to 40° C., and to the solution were added 150 g of hydrochloric acid having a concentration of 35% by weight and 75 g of acetaldehyde. The acetalization was carried out by maintaining the solution temperature at 40° C. to precipitate a reaction product.

The polyvinyl alcohol used had an average degree of polymerization of 200 and a degree of saponification of 97.9 mol %, and contained 5.5 mol % of a carboxyl group-containing constitutional unit represented by the formula (1-4) (in the formula (1-4), $R^6$ represents a single bond, $X^6$ represents a hydrogen atom, $R^7$ represents a methylene group, and $X^7$ represents a hydrogen atom, SP value of the constitutional unit: 15.1).

Then, the reaction solution was held to maintain the temperature at 40° C. for three hours, thereby completing the reaction. The resulting solution was subjected to neutralization, washing with water, and drying by normal methods, whereby a modified polyvinyl acetal resin powder was obtained.

The obtained modified polyvinyl acetal resin was dissolved in dimethylsulfoxide (DMSO-$D_6$), and analyzed by $^{13}$C-NMR (nuclear magnetic resonance spectrum) to confirm the presence of the carboxyl group-containing constitutional unit represented by the formula (1-4) (amount: 5.5 mol %).

Table 1 shows the acetal group content, the acetyl group content, and the hydroxyl group content measured by C-NMR.

An epoxy resin composition was prepared as in Example 1, except that the obtained modified polyvinyl acetal resin was used.

Example 8

(Preparation of Modified Polyvinyl Acetal Resin)

An amount of 200 g of polyvinyl alcohol was added to 1,800 g of pure water, and stirred at 90° C. for about two hours to be dissolved. The solution was cooled to 40° C., and to the solution were added 150 g of hydrochloric acid having a concentration of 35% by weight and 75 g of acetaldehyde. The acetalization was carried out by maintaining the solution temperature at 40° C. to precipitate a reaction product.

The polyvinyl alcohol used had an average degree of polymerization of 450 and a degree of saponification of 97.9 mol %, and contained 5.5 mol % of a carboxyl group-containing constitutional unit represented by the formula (1-4) (in the formula (1-4), $R^6$ represents a single bond, $X^6$ represents a hydrogen atom, $R^7$ represents a methylene group, and $X^7$ represents a hydrogen atom, SP value of the constitutional unit: 15.1).

Then, the reaction solution was held to maintain the temperature at 40° C. for three hours, thereby completing the reaction. The resulting solution was subjected to neutralization, washing with water, and drying by normal methods, whereby a modified polyvinyl acetal resin powder was obtained.

The obtained modified polyvinyl acetal resin was dissolved in dimethylsulfoxide (DMSO-$D_6$), and analyzed by $^{13}$C-NMR (nuclear magnetic resonance spectrum) to confirm the presence of the carboxyl group-containing constitutional unit represented by the formula (1-4) (amount: 5.5 mol %).

Table 1 shows the acetal group content, the acetyl group content, and the hydroxyl group content measured by $^{13}$C-NMR.

An epoxy resin composition was prepared as in Example 1, except that the obtained modified polyvinyl acetal resin was used.

Example 9

(Preparation of Modified Polyvinyl Acetal Resin)

An amount of 200 g of polyvinyl alcohol was added to 1,800 g of pure water, and stirred at 90° C. for about two hours to be dissolved. The solution was cooled to 40° C., and to the solution were added 150 g of hydrochloric acid having a concentration of 35% by weight and 75 g of acetaldehyde. The acetalization was carried out by maintaining the solution temperature at 40° C. to precipitate a reaction product.

The polyvinyl alcohol used had an average degree of polymerization of 3,800 and a degree of saponification of 97.9 mol %, and contained 5.5 mol % of a carboxyl group-containing constitutional unit represented by the formula (1-4) (in the formula (1-4), $R^6$ represents a single bond, $X^6$ represents a hydrogen atom, $R^7$ represents a methylene group, and $X^7$ represents a hydrogen atom, SP value of the constitutional unit: 15.1).

Then, the reaction solution was held to maintain the temperature at 40° C. for three hours, thereby completing the reaction. The resulting solution was subjected to neutralization, washing with water, and drying by normal methods, whereby a modified polyvinyl acetal resin powder was obtained.

The obtained modified polyvinyl acetal resin was dissolved in dimethylsulfoxide (DMSO-$D_6$), and analyzed by $^{13}$C-NMR (nuclear magnetic resonance spectrum) to confirm the presence of the carboxyl group-containing constitutional unit represented by the formula (1-4) (amount: 5.5 mol %).

Table 1 shows the acetal group content, the acetyl group content, and the hydroxyl group content measured by $^{13}$C-NMR.

An epoxy resin composition was prepared as in Example 1, except that the obtained modified polyvinyl acetal resin was used.

Example 10

(Preparation of Modified Polyvinyl Acetal Resin)

An amount of 200 g of polyvinyl alcohol was added to 1,800 g of pure water, and stirred at 90° C. for about two hours to be dissolved. The solution was cooled to 40° C., and to the solution were added 150 g of hydrochloric acid having a concentration of 35% by weight and 75 g of acetaldehyde. The acetalization was carried out by maintaining the solution temperature at 40° C. to precipitate a reaction product.

The polyvinyl alcohol used had an average degree of polymerization of 5,000 and a degree of saponification of 97.9 mol %, and contained 5.5 mol % of a carboxyl group-containing constitutional unit represented by the formula (1-4) (in the formula (1-4), $R^6$ represents a single bond, $X^6$ represents a hydrogen atom, $R^7$ represents a methylene group, and $X^7$ represents a hydrogen atom, SP value of the constitutional unit: 15.1).

Then, the reaction solution was held to maintain the temperature at 40° C. for three hours, thereby completing the reaction. The resulting solution was subjected to neutralization, washing with water, and drying by normal methods, whereby a modified polyvinyl acetal resin powder was obtained.

The obtained modified polyvinyl acetal resin was dissolved in dimethylsulfoxide (DMSO-$D_6$), and analyzed by $^{13}$C-NMR (nuclear magnetic resonance spectrum) to confirm the presence of the carboxyl group-containing constitutional unit represented by the formula (1-4) (amount: 5.5 mol %).

Table 1 shows the acetal group content, the acetyl group content, and the hydroxyl group content measured by $^{13}$C-NMR.

An epoxy resin composition was prepared as in Example 1, except that the obtained modified polyvinyl acetal resin was used.

Example 11

(Preparation of Modified Polyvinyl Acetal Resin)

An amount of 200 g of polyvinyl alcohol was added to 1,800 g of pure water, and stirred at 90° C. for about two hours to be dissolved. The solution was cooled to 40° C., and to the solution were added 150 g of hydrochloric acid having a concentration of 35% by weight and 85 g of acetaldehyde. The acetalization was carried out by maintaining the solution temperature at 40° C. to precipitate a reaction product.

The polyvinyl alcohol used had an average degree of polymerization of 2,500 and a degree of saponification of 97.9 mol %, and contained 5.1 mol % of a carboxyl group-containing constitutional unit represented by the formula (1-4) (in the formula (1-4), $R^6$ represents a single bond, $X^6$ represents a hydrogen atom, $R^7$ represents a methylene group, and $X^7$ represents a hydrogen atom, SP value of the constitutional unit: 15.1).

Then, the reaction solution was held to maintain the temperature at 40° C. for three hours, thereby completing the reaction. The resulting solution was subjected to neutralization, washing with water, and drying by normal methods, whereby a modified polyvinyl acetal resin powder was obtained.

The obtained modified polyvinyl acetal resin was dissolved in dimethylsulfoxide (DMSO-$D_6$), and analyzed by $^{13}$C-NMR (nuclear magnetic resonance spectrum) to confirm the presence of the carboxyl group-containing constitutional unit represented by the formula (1-4) (amount: 5.1 mol %).

Table 1 shows the acetal group content, the acetyl group content, and the hydroxyl group content measured by $^{13}$C-NMR.

An epoxy resin composition was prepared as in Example 1, except that the obtained modified polyvinyl acetal resin was used.

Example 12

(Preparation of Modified Polyvinyl Acetal Resin)

An amount of 200 g of polyvinyl alcohol was added to 1,800 g of pure water, and stirred at 90° C. for about two hours to be dissolved. The solution was cooled to 40° C., and to the solution were added 150 g of hydrochloric acid having a concentration of 35% by weight and 60 g of acetaldehyde. The acetalization was carried out by maintaining the solution temperature at 40° C. to precipitate a reaction product.

The polyvinyl alcohol used had an average degree of polymerization of 2,500 and a degree of saponification of 97.9 mol %, and contained 14.5 mol % of a carboxyl group-containing constitutional unit represented by the formula (1-4) (in the formula (1-4), $R^6$ represents a single bond, $X^6$ represents a hydrogen atom, $R^7$ represents a methylene group, and $X^7$ represents a hydrogen atom, SP value of the constitutional unit: 15.1).

Then, the reaction solution was held to maintain the temperature at 40° C. for three hours, thereby completing the reaction. The resulting solution was subjected to neutralization, washing with water, and drying by normal methods, whereby a modified polyvinyl acetal resin powder was obtained.

The obtained modified polyvinyl acetal resin was dissolved in dimethylsulfoxide (DMSO-$D_6$), and analyzed by $^{13}$C-NMR (nuclear magnetic resonance spectrum) to confirm the presence of the carboxyl group-containing constitutional unit represented by the formula (1-4) (amount: 14.5 mol %).

Table 1 shows the acetal group content, the acetyl group content, and the hydroxyl group content measured by $^{13}$C-NMR.

An epoxy resin composition was prepared as in Example 1, except that the obtained modified polyvinyl acetal resin was used.

Example 13

(Preparation of Modified Polyvinyl Acetal Resin)

An amount of 200 g of polyvinyl alcohol was added to 1,800 g of pure water, and stirred at 90° C. for about two hours to be dissolved. The solution was cooled to 40° C., and to the solution were added 150 g of hydrochloric acid having a concentration of 35% by weight and 85 g of acetaldehyde. The acetalization was carried out by maintaining the solution temperature at 40° C. to precipitate a reaction product.

The polyvinyl alcohol used had an average degree of polymerization of 2,500 and a degree of saponification of 97.9 mol %, and contained 5.1 mol % of a carboxyl group-containing constitutional unit represented by the formula (1-4) (in the formula (1-4), $R^6$ represents a single bond, $X^6$ represents a hydrogen atom, $R^7$ represents a methylene group, and $X^7$ represents a hydrogen atom, SP value of the constitutional unit: 15.1).

Then, the reaction solution was held to maintain the temperature at 40° C. for three hours, thereby completing the reaction. The resulting solution was subjected to neutralization, washing with water, and drying by normal methods, whereby a modified polyvinyl acetal resin powder was obtained.

The obtained modified polyvinyl acetal resin was dissolved in dimethylsulfoxide (DMSO-$D_6$), and analyzed by $^{13}$C-NMR (nuclear magnetic resonance spectrum) to confirm the presence of the carboxyl group-containing constitutional unit represented by the formula (1-4) (amount: 5.1 mol %).

Table 1 shows the acetal group content, the acetyl group content, and the hydroxyl group content measured by $^{13}$C-NMR.

An epoxy resin composition was prepared as in Example 1, except that the obtained modified polyvinyl acetal resin was used.

Example 14

(Preparation of Modified Polyvinyl Acetal Resin)

An amount of 200 g of polyvinyl alcohol was added to 1,800 g of pure water, and stirred at 90° C. for about two hours to be dissolved. The solution was cooled to 40° C., and to the solution were added 150 g of hydrochloric acid having a concentration of 35% by weight and 60 g of acetaldehyde. The acetalization was carried out by maintaining the solution temperature at 40° C. to precipitate a reaction product.

The polyvinyl alcohol used had an average degree of polymerization of 2,500 and a degree of saponification of 97.9 mol %, and contained 15.5 mol % of a carboxyl group-containing constitutional unit represented by the formula (1-4) (in the formula (1-4), $R^6$ represents a single bond, $X^6$ represents a hydrogen atom, $R^7$ represents a methylene group, and $X^7$ represents a hydrogen atom, SP value of the constitutional unit: 15.1).

Then, the reaction solution was held to maintain the temperature at 40° C. for three hours, thereby completing the reaction. The resulting solution was subjected to neutralization, washing with water, and drying by normal methods, whereby a modified polyvinyl acetal resin powder was obtained.

The obtained modified polyvinyl acetal resin was dissolved in dimethylsulfoxide (DMSO-$D_6$), and analyzed by $^{13}$C-NMR (nuclear magnetic resonance spectrum) to confirm the presence of the carboxyl group-containing constitutional unit represented by the formula (1-4) (amount: 15.5 mol %).

Table 1 shows the acetal group content, the acetyl group content, and the hydroxyl group content measured by $^{13}$C-NMR.

An epoxy resin composition was prepared as in Example 1, except that the obtained modified polyvinyl acetal resin was used.

Example 15

(Preparation of Modified Polyvinyl Acetal Resin)

An amount of 200 g of polyvinyl alcohol was added to 1,800 g of pure water, and stirred at 90° C. for about two hours to be dissolved. The solution was cooled to 40° C., and to the solution were added 150 g of hydrochloric acid having a concentration of 35% by weight and 90 g of acetaldehyde. The acetalization was carried out by maintaining the solution temperature at 40° C. to precipitate a reaction product.

The polyvinyl alcohol used had an average degree of polymerization of 2,500 and a degree of saponification of 97.9 mol %, and contained 5.1 mol % of a carboxyl group-containing constitutional unit represented by the formula (1-4) (in the formula (1-4), $R^6$ represents a single bond, $X^6$ represents a hydrogen atom, $R^7$ represents a methylene group, and $X^7$ represents a hydrogen atom, SP value of the constitutional unit: 15.1).

Then, the reaction solution was held to maintain the temperature at 40° C. for three hours, thereby completing the reaction. The resulting solution was subjected to neutralization, washing with water, and drying by normal methods, whereby a modified polyvinyl acetal resin powder was obtained.

The obtained modified polyvinyl acetal resin was dissolved in dimethylsulfoxide (DMSO-$D_6$), and analyzed by $^{13}$C-NMR (nuclear magnetic resonance spectrum) to confirm the presence of the carboxyl group-containing constitutional unit represented by the formula (1-4) (amount: 5.1 mol %).

Table 1 shows the acetal group content, the acetyl group content, and the hydroxyl group content measured by $^{13}$C-NMR.

An epoxy resin composition was prepared as in Example 1, except that the obtained modified polyvinyl acetal resin was used.

Example 16

(Preparation of Modified Polyvinyl Acetal Resin)

An amount of 200 g of polyvinyl alcohol was added to 1,800 g of pure water, and stirred at 90° C. for about two hours to be dissolved. The solution was cooled to 40° C., and to the solution were added 150 g of hydrochloric acid having a concentration of 35% by weight and 85 g of acetaldehyde. The acetalization was carried out by maintaining the solution temperature at 40° C. to precipitate a reaction product.

The polyvinyl alcohol used had an average degree of polymerization of 2,500 and a degree of saponification of 97.9 mol %, and contained 5.1 mol % of a carboxyl group-containing constitutional unit represented by the formula (1-4) (in the formula (1-4), $R^6$ represents a single bond, $X^6$ represents a hydrogen atom, $R^7$ represents a methylene group, and $X^7$ represents a hydrogen atom, SP value of the constitutional unit: 15.1).

Then, the reaction solution was held to maintain the temperature at 40° C. for three hours, thereby completing the reaction. The resulting solution was subjected to neutralization, washing with water, and drying by normal methods, whereby a modified polyvinyl acetal resin powder was obtained.

The obtained modified polyvinyl acetal resin was dissolved in dimethylsulfoxide (DMSO-$D_6$), and analyzed by $^{13}$C-NMR (nuclear magnetic resonance spectrum) to confirm the presence of the carboxyl group-containing constitutional unit represented by the formula (1-4) (amount: 5.1 mol %).

Table 1 shows the acetal group content, the acetyl group content, and the hydroxyl group content measured by $^{13}$C-NMR.

An epoxy resin composition was prepared as in Example 1, except that the obtained modified polyvinyl acetal resin was used.

Example 17

(Preparation of Modified Polyvinyl Acetal Resin)

An amount of 200 g of polyvinyl alcohol was added to 1,800 g of pure water, and stirred at 90° C. for about two hours to be dissolved. The solution was cooled to 40° C., and to the solution were added 150 g of hydrochloric acid having a concentration of 35% by weight and 60 g of acetaldehyde. The acetalization was carried out by maintaining the solution temperature at 40° C. to precipitate a reaction product.

The polyvinyl alcohol used had an average degree of polymerization of 2,500 and a degree of saponification of 97.9 mol %, and contained 10.0 mol % of a carboxyl group-containing constitutional unit represented by the formula (1-4) (in the formula (1-4), $R^6$ represents a single bond, $X^6$ represents a hydrogen atom, $R^7$ represents a methylene group, and $X^7$ represents a hydrogen atom, SP value of the constitutional unit: 15.1).

Then, the reaction solution was held to maintain the temperature at 40° C. for three hours, thereby completing the reaction. The resulting solution was subjected to neutralization, washing with water, and drying by normal methods, whereby a modified polyvinyl acetal resin powder was obtained.

The obtained modified polyvinyl acetal resin was dissolved in dimethylsulfoxide (DMSO-$D_6$), and analyzed by $^{13}$C-NMR (nuclear magnetic resonance spectrum) to confirm the presence of the carboxyl group-containing constitutional unit represented by the formula (1-4) (amount: 10.0 mol %).

Table 1 shows the acetal group content, the acetyl group content, and the hydroxyl group content measured by $^{13}$C-NMR.

An epoxy resin composition was prepared as in Example 1, except that the obtained modified polyvinyl acetal resin was used.

Example 18

(Preparation of Modified Polyvinyl Acetal Resin)

An amount of 200 g of polyvinyl alcohol was added to 1,800 g of pure water, and stirred at 90° C. for about two hours to be dissolved. The solution was cooled to 40° C., and to the solution were added 150 g of hydrochloric acid having a concentration of 35% by weight and 60 g of acetaldehyde. The acetalization was carried out by maintaining the solution temperature at 40° C. to precipitate a reaction product.

The polyvinyl alcohol used had an average degree of polymerization of 2,500 and a degree of saponification of 97.9 mol %, and contained 13.5 mol % of a carboxyl group-containing constitutional unit represented by the formula (1-4) (in the formula (1-4), $R^6$ represents a single bond, $X^6$ represents a hydrogen atom, $R^7$ represents a methylene group, and $X^7$ represents a hydrogen atom, SP value of the constitutional unit: 15.1).

Then, the reaction solution was held to maintain the temperature at 40° C. for three hours, thereby completing the reaction. The resulting solution was subjected to neutralization, washing with water, and drying by normal methods, whereby a modified polyvinyl acetal resin powder was obtained.

The obtained modified polyvinyl acetal resin was dissolved in dimethylsulfoxide (DMSO-$D_6$), and analyzed by $^{13}$C-NMR (nuclear magnetic resonance spectrum) to confirm the presence of the carboxyl group-containing constitutional unit represented by the formula (1-4) (amount: 13.5 mol %).

Table 1 shows the acetal group content, the acetyl group content, and the hydroxyl group content measured by $^{13}$C-NMR.

An epoxy resin composition was prepared as in Example 1, except that the obtained modified polyvinyl acetal resin was used.

Example 19

(Preparation of Modified Polyvinyl Acetal Resin)

An amount of 200 g of polyvinyl alcohol was added to 1,800 g of pure water, and stirred at 90° C. for about two hours to be dissolved. The solution was cooled to 40° C., and to the solution were added 150 g of hydrochloric acid having a concentration of 35% by weight and 75 g of acetaldehyde. The acetalization was carried out by maintaining the solution temperature at 40° C. to precipitate a reaction product.

The polyvinyl alcohol used had an average degree of polymerization of 2,500 and a degree of saponification of 97.9 mol %, and contained 5.5 mol % of a carboxyl group-containing constitutional unit represented by the formula (1-4) (in the formula (1-4), $R^6$ represents a single bond, $X^6$ represents a hydrogen atom, $R^7$ represents a methylene group, and $X^7$ represents a hydrogen atom, SP value of the constitutional unit: 15.1).

Then, the reaction solution was held to maintain the temperature at 40° C. for three hours, thereby completing the reaction. The resulting solution was subjected to neutralization, washing with water, and drying by normal methods, whereby a modified polyvinyl acetal resin powder was obtained.

The obtained modified polyvinyl acetal resin was dissolved in dimethylsulfoxide (DMSO-$D_6$), and analyzed by $^{13}$C-NMR (nuclear magnetic resonance spectrum) to confirm the presence of the carboxyl group-containing constitutional unit represented by the formula (1-4) (amount: 5.5 mol %).

Table 2 shows the acetal group content, the acetyl group content, and the hydroxyl group content measured by $^{13}$C-NMR.

An epoxy resin composition was prepared as in Example 1, except that the obtained modified polyvinyl acetal resin was used and the amount of the modified polyvinyl acetal resin was changed as shown in Table 4.

Examples 20 to 22

Epoxy resin compositions were prepared as in Example 1, except that the modified polyvinyl acetal resin obtained in Example 19 was used and the amount of the modified polyvinyl acetal resin was changed as shown in Table 4.

Example 23

(Preparation of Modified Polyvinyl Acetal Resin)

An amount of 200 g of polyvinyl alcohol was added to 1,800 g of pure water, and stirred at 90° C. for about two hours to be dissolved. The solution was cooled to 40° C., and to the solution were added 150 g of hydrochloric acid having a concentration of 35% by weight and 60 g of acetaldehyde. The acetalization was carried out by maintaining the solution temperature at 40° C. to precipitate a reaction product.

The polyvinyl alcohol used had an average degree of polymerization of 2,500 and a degree of saponification of 97.9 mol %, and contained 20.0 mol % of a carboxyl group-containing constitutional unit represented by the formula (1-4) (in the formula (1-4), $R^6$ represents a single bond, $X^6$ represents a hydrogen atom, $R^7$ represents a methylene group, and $X^7$ represents a hydrogen atom, SP value of the constitutional unit: 15.1).

Then, the reaction solution was held to maintain the temperature at 40° C. for three hours, thereby completing the reaction. The resulting solution was subjected to neutralization, washing with water, and drying by normal methods, whereby a modified polyvinyl acetal resin powder was obtained.

The obtained modified polyvinyl acetal resin was dissolved in dimethylsulfoxide (DMSO-$D_6$), and analyzed by $^{13}$C-NMR (nuclear magnetic resonance spectrum) to confirm the presence of the carboxyl group-containing constitutional unit represented by the formula (1-4) (amount: 20.0 mol %).

Table 2 shows the acetal group content, the acetyl group content, and the hydroxyl group content measured by $^{13}$C-NMR.

An epoxy resin composition was prepared as in Example 1, except that the obtained modified polyvinyl acetal resin was used and the amount of the modified polyvinyl acetal resin was changed as shown in Table 4.

Example 24

(Preparation of Modified Polyvinyl Acetal Resin)

An amount of 200 g of polyvinyl alcohol was added to 1,800 g of pure water, and stirred at 90° C. for about two hours to be dissolved. The solution was cooled to 40° C., and to the solution were added 150 g of hydrochloric acid having a concentration of 35% by weight and 90 g of acetaldehyde. The acetalization was carried out by maintaining the solution temperature at 40° C. to precipitate a reaction product.

The polyvinyl alcohol used had an average degree of polymerization of 2,500 and a degree of saponification of 97.9 mol %, and contained 5.2 mol % of a carboxyl group-containing constitutional unit represented by the formula (1-4) (in the formula (1-4), $R^6$ represents a single bond, $X^6$ represents a hydrogen atom, $R^7$ represents a methylene group, and $X^7$ represents a hydrogen atom, SP value of the constitutional unit: 15.1).

Then, the reaction solution was held to maintain the temperature at 40° C. for three hours, thereby completing the reaction. The resulting solution was subjected to neutralization, washing with water, and drying by normal methods, whereby a modified polyvinyl acetal resin powder was obtained.

The obtained modified polyvinyl acetal resin was dissolved in dimethylsulfoxide (DMSO-$D_6$), and analyzed by $^{13}$C-NMR (nuclear magnetic resonance spectrum) to confirm the presence of the carboxyl group-containing constitutional unit represented by the formula (1-4) (amount: 5.2 mol %).

Table 2 shows the acetal group content, the acetyl group content, and the hydroxyl group content measured by $^{13}$C-NMR.

An epoxy resin composition was prepared as in Example 1, except that the obtained modified polyvinyl acetal resin was used and the amount of the modified polyvinyl acetal resin was changed as shown in Table 4.

Example 25

(Preparation of Modified Polyvinyl Acetal Resin)

An amount of 200 g of polyvinyl alcohol was added to 1,800 g of pure water, and stirred at 90° C. for about two hours to be dissolved. The solution was cooled to 40° C., and to the solution were added 150 g of hydrochloric acid having a concentration of 35% by weight and 70 g of acetaldehyde. The acetalization was carried out by maintaining the solution temperature at 40° C. to precipitate a reaction product.

The polyvinyl alcohol used had an average degree of polymerization of 2,500 and a degree of saponification of 97.9 mol %, and contained 5.1 mol % of a sulfonic acid group-containing constitutional unit represented by the formula (3) (in the formula (3), $R^u$ represents a single bond and $X^9$ represents a hydrogen atom, SP value of the constitutional unit: 20.2).

Then, the reaction solution was held to maintain the temperature at 40° C. for three hours, thereby completing the reaction. The resulting solution was subjected to neutralization, washing with water, and drying by normal methods, whereby a modified polyvinyl acetal resin powder was obtained.

The obtained modified polyvinyl acetal resin was dissolved in dimethylsulfoxide (DMSO-$D_6$), and analyzed by $^{13}$C-NMR (nuclear magnetic resonance spectrum) to confirm the presence of the sulfonic acid group-containing constitutional unit represented by the formula (3) (amount: 5.1 mol %).

Table 2 shows the acetal group content, the acetyl group content, and the hydroxyl group content measured by $^{13}$C-NMR.

An epoxy resin composition was prepared as in Example 1, except that the obtained modified polyvinyl acetal resin was used.

Example 26

(Preparation of Modified Polyvinyl Acetal Resin)

An amount of 200 g of polyvinyl alcohol was added to 1,800 g of pure water, and stirred at 90° C. for about two hours to be dissolved. The solution was cooled to 40° C., and to the solution were added 150 g of hydrochloric acid having a concentration of 35% by weight and 70 g of acetaldehyde. The acetalization was carried out by maintaining the solution temperature at 40° C. to precipitate a reaction product.

The polyvinyl alcohol used had an average degree of polymerization of 2,500 and a degree of saponification of 97.9 mol %, and contained 5.5 mol % of an ethylene oxide group-containing constitutional unit represented by the formula (4) (in the formula (4), $R^{11}$ represents a methylene group, $X^{10}$ represents a hydrogen atom, and n represents 5, SP value of the constitutional unit: 10.9).

Then, the reaction solution was held to maintain the temperature at 40° C. for three hours, thereby completing the reaction. The resulting solution was subjected to neutralization, washing with water, and drying by normal methods, whereby a modified polyvinyl acetal resin powder was obtained.

The obtained modified polyvinyl acetal resin was dissolved in dimethylsulfoxide (DMSO-$D_6$), and analyzed by $^{13}$C-NMR (nuclear magnetic resonance spectrum) to confirm the presence of the ethylene oxide group-containing constitutional unit represented by the formula (4) (amount: 5.5 mol %).

Table 2 shows the acetal group content, the acetyl group content, and the hydroxyl group content measured by $^{13}$C-NMR.

An epoxy resin composition was prepared as in Example 1, except that the obtained modified polyvinyl acetal resin was used.

Example 27

(Preparation of Modified Polyvinyl Acetal Resin)

An amount of 200 g of polyvinyl alcohol was added to 1,800 g of pure water, and stirred at 90° C. for about two hours to be dissolved. The solution was cooled to 40° C., and to the solution were added 150 g of hydrochloric acid having a concentration of 35% by weight and 120 g of acetaldehyde. The acetalization was carried out by maintaining the solution temperature at 40° C. to precipitate a reaction product.

The polyvinyl alcohol used had an average degree of polymerization of 2,500 and a degree of saponification of 97.9 mol %, and contained 6.5 mol % of a carboxyl group-containing constitutional unit represented by the formula (1-4) (in the formula (1-4), $R^6$ represents a single bond, $X^6$ represents a hydrogen atom, $R^7$ represents a methylene group, and $X^7$ represents a hydrogen atom, SP value of the constitutional unit: 15.1).

Then, the reaction solution was held to maintain the temperature at 40° C. for three hours, thereby completing the reaction. The resulting solution was subjected to neutralization, washing with water, and drying by normal methods, whereby a modified polyvinyl acetal resin powder was obtained.

The obtained modified polyvinyl acetal resin was dissolved in dimethylsulfoxide (DMSO-$D_6$), and analyzed by $^{13}$C-NMR (nuclear magnetic resonance spectrum) to confirm the presence of the carboxyl group-containing constitutional unit represented by the formula (1-4) (amount: 6.5 mol %).

Table 2 shows the acetal group content, the acetyl group content, and the hydroxyl group content measured by $^{13}$C-NMR.

An epoxy resin composition was prepared as in Example 1, except that the obtained modified polyvinyl acetal resin was used.

Example 28

(Preparation of Modified Polyvinyl Acetal Resin)

An amount of 200 g of polyvinyl alcohol was added to 1,800 g of pure water, and stirred at 90° C. for about two hours to be dissolved. The solution was cooled to 40° C., and to the solution were added 150 g of hydrochloric acid having a concentration of 35% by weight and 50 g of acetaldehyde. The acetalization was carried out by maintaining the solution temperature at 40° C. to precipitate a reaction product.

The polyvinyl alcohol used had an average degree of polymerization of 2,500 and a degree of saponification of 97.9 mol %, and contained 5.5 mol % of a carboxyl group-containing constitutional unit represented by the formula (1-4) (in the formula (1-4), $R^6$ represents a single bond, $X^6$ represents a hydrogen atom, $R^7$ represents a methylene group, and $X^7$ represents a hydrogen atom, SP value of the constitutional unit: 15.1).

Then, the reaction solution was held to maintain the temperature at 40° C. for three hours, thereby completing the reaction. The resulting solution was subjected to neutralization, washing with water, and drying by normal methods, whereby a modified polyvinyl acetal resin powder was obtained.

The obtained modified polyvinyl acetal resin was dissolved in dimethylsulfoxide (DMSO-$D_6$), and analyzed by $^{13}$C-NMR (nuclear magnetic resonance spectrum) to confirm the presence of the carboxyl group-containing constitutional unit represented by the formula (1-4) (amount: 5.5 mol %).

Table 2 shows the acetal group content, the acetyl group content, and the hydroxyl group content measured by $^{13}$C-NMR.

An epoxy resin composition was prepared as in Example 1, except that the obtained modified polyvinyl acetal resin was used.

Example 29

(Preparation of Modified Polyvinyl Acetal Resin)

An amount of 200 g of polyvinyl alcohol was added to 1,800 g of pure water, and stirred at 90° C. for about two hours to be dissolved. The solution was cooled to 40° C., and to the solution were added 150 g of hydrochloric acid having a concentration of 35% by weight and 75 g of acetaldehyde. The acetalization was carried out by maintaining the solution temperature at 40° C. to precipitate a reaction product.

The polyvinyl alcohol used had an average degree of polymerization of 2,500 and a degree of saponification of 97.9 mol %, and contained 3.5 mol % of a carboxyl group-containing constitutional unit represented by the formula (1-4) (in the formula (1-4), $R^6$ represents a single bond, $X^6$ represents a hydrogen atom, $R^7$ represents a methylene group, and $X^7$ represents a hydrogen atom, SP value of the constitutional unit: 15.1).

Then, the reaction solution was held to maintain the temperature at 40° C. for three hours, thereby completing the reaction. The resulting solution was subjected to neutralization, washing with water, and drying by normal methods, whereby a modified polyvinyl acetal resin powder was obtained.

The obtained modified polyvinyl acetal resin was dissolved in dimethylsulfoxide (DMSO-$D_6$), and analyzed by $^{13}$C-NMR (nuclear magnetic resonance spectrum) to confirm the presence of the carboxyl group-containing constitutional unit represented by the formula (1-4) (amount: 3.5 mol %).

Table 2 shows the acetal group content, the acetyl group content, and the hydroxyl group content measured by $^{13}$C-NMR.

An epoxy resin composition was prepared as in Example 1, except that the obtained modified polyvinyl acetal resin was used.

Example 30

(Preparation of Modified Polyvinyl Acetal Resin)

An amount of 200 g of polyvinyl alcohol was added to 1,800 g of pure water, and stirred at 90° C. for about two hours to be dissolved. The solution was cooled to 40° C., and to the solution were added 150 g of hydrochloric acid having a concentration of 35% by weight and 75 g of acetaldehyde. The acetalization was carried out by maintaining the solution temperature at 40° C. to precipitate a reaction product.

The polyvinyl alcohol used had an average degree of polymerization of 2,500 and a degree of saponification of 97.9 mol %, and contained 33.5 mol % of a carboxyl group-containing constitutional unit represented by the formula (1-4) (in the formula (1-4), $R^6$ represents a single bond, $X^6$ represents a hydrogen atom, $R^7$ represents a methylene group, and $X^7$ represents a hydrogen atom, SP value of the constitutional unit: 15.1).

Then, the reaction solution was held to maintain the temperature at 40° C. for three hours, thereby completing the reaction. The resulting solution was subjected to neutralization, washing with water, and drying by normal methods, whereby a modified polyvinyl acetal resin powder was obtained.

The obtained modified polyvinyl acetal resin was dissolved in dimethylsulfoxide (DMSO-$D_6$), and analyzed by $^{13}$C-NMR (nuclear magnetic resonance spectrum) to confirm the presence of the carboxyl group-containing constitutional unit represented by the formula (1-4) (amount: 33.5 mol %).

Table 2 shows the acetal group content, the acetyl group content, and the hydroxyl group content measured by $^{13}$C-NMR.

An epoxy resin composition was prepared as in Example 1, except that the obtained modified polyvinyl acetal resin was used.

Example 31

(Preparation of Modified Polyvinyl Acetal Resin)

An amount of 200 g of polyvinyl alcohol was added to 1,800 g of pure water, and stirred at 90° C. for about two hours to be dissolved. The solution was cooled to 40° C., and to the solution were added 150 g of hydrochloric acid having a concentration of 35% by weight and 120 g of acetaldehyde. The acetalization was carried out by maintaining the solution temperature at 40° C. to precipitate a reaction product.

The polyvinyl alcohol used had an average degree of polymerization of 2,500 and a degree of saponification of 97.9 mol %, and contained 5.1 mol % of a carboxyl group-containing constitutional unit represented by the formula (1-4) (in the formula (1-4), $R^6$ represents a single bond, $X^6$ represents a hydrogen atom, $R^7$ represents a methylene group, and $X^7$ represents a hydrogen atom, SP value of the constitutional unit: 15.1).

Then, the reaction solution was held to maintain the temperature at 40° C. for three hours, thereby completing the reaction. The resulting solution was subjected to neutralization, washing with water, and drying by normal methods, whereby a modified polyvinyl acetal resin powder was obtained.

The obtained modified polyvinyl acetal resin was dissolved in dimethylsulfoxide (DMSO-$D_6$), and analyzed by $^{13}$C-NMR (nuclear magnetic resonance spectrum) to confirm the presence of the carboxyl group-containing constitutional unit represented by the formula (1-4) (amount: 5.1 mol %).

Table 2 shows the acetal group content, the acetyl group content, and the hydroxyl group content measured by $^{13}$C-NMR.

An epoxy resin composition was prepared as in Example 1, except that the obtained modified polyvinyl acetal resin was used.

Example 32

(Preparation of Modified Polyvinyl Acetal Resin)

An amount of 200 g of polyvinyl alcohol was added to 1,800 g of pure water, and stirred at 90° C. for about two hours to be dissolved. The solution was cooled to 40° C., and to the solution were added 150 g of hydrochloric acid having a concentration of 35% by weight and 70 g of acetaldehyde. The acetalization was carried out by maintaining the solution temperature at 40° C. to precipitate a reaction product.

The polyvinyl alcohol used had an average degree of polymerization of 2,500 and a degree of saponification of 97.9 mol %, and contained 32.0 mol % of a carboxyl group-containing constitutional unit represented by the formula (1-4) (in the formula (1-4), $R^6$ represents a single bond, $X^6$ represents a hydrogen atom, $R^7$ represents a methylene group, and $X^7$ represents a hydrogen atom, SP value of the constitutional unit: 15.1).

Then, the reaction solution was held to maintain the temperature at 40° C. for three hours, thereby completing the reaction. The resulting solution was subjected to neutralization, washing with water, and drying by normal methods, whereby a modified polyvinyl acetal resin powder was obtained.

The obtained modified polyvinyl acetal resin was dissolved in dimethylsulfoxide (DMSO-$D_6$), and analyzed by $^{13}$C-NMR (nuclear magnetic resonance spectrum) to confirm the presence of the carboxyl group-containing constitutional unit represented by the formula (1-4) (amount: 32.0 mol %).

Table 2 shows the acetal group content, the acetyl group content, and the hydroxyl group content measured by $^{13}$C-NMR.

An epoxy resin composition was prepared as in Example 1, except that the obtained modified polyvinyl acetal resin was used.

Example 33

(Preparation of Modified Polyvinyl Acetal Resin)

An amount of 200 g of polyvinyl alcohol was added to 1,800 g of pure water, and stirred at 90° C. for about two hours to be dissolved. The solution was cooled to 40° C., and to the solution were added 150 g of hydrochloric acid having a concentration of 35% by weight and 120 g of acetaldehyde. The acetalization was carried out by maintaining the solution temperature at 40° C. to precipitate a reaction product.

The polyvinyl alcohol used had an average degree of polymerization of 2,500 and a degree of saponification of 97.9 mol %, and contained 3.5 mol % of a carboxyl group-containing constitutional unit represented by the formula (1-4) (in the formula (1-4), $R^6$ represents a single bond, $X^6$ represents a hydrogen atom, $R^7$ represents a methylene group, and $X^7$ represents a hydrogen atom, SP value of the constitutional unit: 15.1).

Then, the reaction solution was held to maintain the temperature at 40° C. for three hours, thereby completing the reaction. The resulting solution was subjected to neutralization, washing with water, and drying by normal methods, whereby a modified polyvinyl acetal resin powder was obtained.

The obtained modified polyvinyl acetal resin was dissolved in dimethylsulfoxide (DMSO-$D_6$), and analyzed by $^{13}$C-NMR (nuclear magnetic resonance spectrum) to confirm the presence of the carboxyl group-containing constitutional unit represented by the formula (1-4) (amount: 3.5 mol %).

Table 2 shows the acetal group content, the acetyl group content, and the hydroxyl group content measured by $^{13}$C-NMR.

An epoxy resin composition was prepared as in Example 1, except that the obtained modified polyvinyl acetal resin was used.

Comparative Example 1

An amount of 200 g of polyvinyl alcohol was added to 1,800 g of pure water, and stirred at 90° C. for about two hours to be dissolved. The solution was cooled to 40° C., and to the solution were added 150 g of hydrochloric acid having a concentration of 35% by weight, 75 g of acetaldehyde, and 10 g of butyraldehyde. The acetalization was carried out by maintaining the solution temperature at 40° C. to precipitate a reaction product.

The polyvinyl alcohol used had an average degree of polymerization of 2,500 and a degree of saponification of 97.9 mol %.

Then, the reaction solution was held to maintain the temperature at 40° C. for three hours, thereby completing the reaction. The resulting solution was subjected to neutralization, washing with water, and drying by normal methods, whereby a modified polyvinyl acetal resin powder was obtained.

Table 2 shows the acetal group content, the acetyl group content, and the hydroxyl group content measured by $^{13}$C-NMR.

An epoxy resin composition was prepared as in Example 1, except that the obtained modified polyvinyl acetal resin was used.

Comparative Example 2

An amount of 200 g of polyvinyl alcohol was added to 1,800 g of pure water, and stirred at 90° C. for about two hours to be dissolved. The solution was cooled to 40° C., and to the solution were added 150 g of hydrochloric acid having a concentration of 35% by weight and 50 g of acetaldehyde. The acetalization was carried out by maintaining the solution temperature at 40° C. to precipitate a reaction product.

The polyvinyl alcohol used had an average degree of polymerization of 2,500 and a degree of saponification of 97.9 mol %, and contained 15.0 mol % of a carboxyl group-containing constitutional unit represented by the formula (1-4) (in the formula (1-4), $R^6$ represents a single bond, $X^6$ represents a hydrogen atom, $R^7$ represents a methylene group, and $X^7$ represents a hydrogen atom, SP value of the constitutional unit: 15.1).

Then, the reaction solution was held to maintain the temperature at 40° C. for three hours, thereby completing the reaction. The resulting solution was subjected to neutralization, washing with water, and drying by normal methods, whereby a modified polyvinyl acetal resin powder was obtained.

The obtained modified polyvinyl acetal resin was dissolved in dimethylsulfoxide (DMSO-$D_6$), and analyzed by $^{13}$C-NMR (nuclear magnetic resonance spectrum) to confirm the presence of the carboxyl group-containing constitutional unit represented by the formula (1-4) (amount: 15.0 mol %).

Table 2 shows the acetal group content, the acetyl group content, and the hydroxyl group content measured by $^{13}$C-NMR.

An epoxy resin composition was prepared as in Example 1, except that the obtained modified polyvinyl acetal resin was used.

Comparative Example 3

An amount of 200 g of polyvinyl alcohol was added to 1,800 g of pure water, and stirred at 90° C. for about two hours to be dissolved. The solution was cooled to 40° C., and to the solution were added 150 g of hydrochloric acid having a concentration of 35% by weight and 120 g of acetaldehyde. The acetalization was carried out by maintaining the solution temperature at 40° C. to precipitate a reaction product.

The polyvinyl alcohol used had an average degree of polymerization of 2,500 and a degree of saponification of 97.9 mol %, and contained 0.4 mol % of a carboxyl group-containing constitutional unit represented by the formula (1-4) (in the formula (1-4), $R^6$ represents a single bond, $X^6$ represents a hydrogen atom, $R^7$ represents a methylene group, and $X^7$ represents a hydrogen atom, SP value of the constitutional unit: 15.1).

Then, the reaction solution was held to maintain the temperature at 40° C. for three hours, thereby completing the reaction. The resulting solution was subjected to neutralization, washing with water, and drying by normal methods, whereby a modified polyvinyl acetal resin powder was obtained.

The obtained modified polyvinyl acetal resin was dissolved in dimethylsulfoxide (DMSO-$D_6$), and analyzed by $^{13}$C-NMR (nuclear magnetic resonance spectrum) to confirm the presence of the carboxyl group-containing constitutional unit represented by the formula (1-4) (amount: 0.4 mol %).

Table 2 shows the acetal group content, the acetyl group content, and the hydroxyl group content measured by $^{13}$C-NMR.

An epoxy resin composition was prepared as in Example 1, except that the obtained modified polyvinyl acetal resin was used.

Comparative Example 4

An amount of 200 g of polyvinyl alcohol was added to 1,800 g of pure water, and stirred at 90° C. for about two hours to be dissolved. The solution was cooled to 40° C., and to the solution were added 150 g of hydrochloric acid having a concentration of 35% by weight and 75 g of acetaldehyde. The acetalization was carried out by maintaining the solution temperature at 40° C. to precipitate a reaction product.

The polyvinyl alcohol used had an average degree of polymerization of 2,500 and a degree of saponification of 97.9 mol %, and contained 5.5 mol % of a Cert-butyl group-containing constitutional unit represented by the following formula (6) (in the formula (6), $R^{13}$ represents an ethylene group, SP value of the constitutional unit: 8.1).

Then, the reaction solution was held to maintain the temperature at 40° C. for three hours, thereby completing the reaction. The resulting solution was subjected to neutralization, washing with water, and drying by normal methods, whereby a modified polyvinyl acetal resin powder was obtained.

The obtained modified polyvinyl acetal resin was dissolved in dimethylsulfoxide (DMSO-$D_6$), and analyzed by $^{13}$C-NMR (nuclear magnetic resonance spectrum) to confirm the presence of the tert-butyl group-containing constitutional unit represented by the following formula (6) (amount: 5.5 mol %).

Table 2 shows the acetal group content, the acetyl group content, and the hydroxyl group content measured by $^{13}$C-NMR.

[Chem. 6]

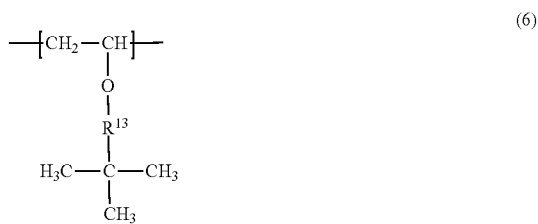

(6)

An epoxy resin composition was prepared as in Example 1, except that the obtained modified polyvinyl acetal resin was used.

TABLE 1

| | | | | | Polyvinyl acetal resin | | | | | |
|---|---|---|---|---|---|---|---|---|---|---|
| | Average degree of polymerization | Acetal group content (mol %) | Acetyl group content (mol %) | Hydroxyl group content (mol %) | Amount of modified group-containing constitutional unit (mol %) | Hydroxyl group content + Hydrogen-bonding group content (mol %) | Type of modified group | Structure of modified group-containing constitutional unit | SP value of modified group-containing constitutional unit | Hydrophilic unit/ Hydrophobic unit |
| Example 1 | 2500 | 67.8 | 2.1 | 25.0 | 5.1 | 30.1 | Carboxyl group | (1-4) | 15.1 | 0.43 |
| Example 2 | 2500 | 47.9 | 2.1 | 25.0 | 25.0 | 50.0 | Carboxyl group | (1-4) | 15.1 | 1.00 |

TABLE 1-continued

| | Polyvinyl acetal resin | | | | | | | | |
|---|---|---|---|---|---|---|---|---|---|
| | Average degree of polymerization | Acetal group content (mol %) | Acetyl group content (mol %) | Hydroxyl group content (mol %) | Amount of modified group-containing constitutional unit (mol %) | Hydroxyl group content + Hydrogen-bonding group content (mol %) | Type of modified group | Structure of modified group-containing constitutional unit | SP value of modified group-containing constitutional unit | Hydrophilic unit/ Hydrophobic unit |
| Example 3 | 2500 | 62.9 | 2.1 | 25.0 | 10.0 | 35.0 | Carboxyl group | (1-4) | 15.1 | 0.54 |
| Example 4 | 2500 | 42.9 | 2.1 | 48.0 | 7.0 | 55.0 | Carboxyl group | (1-4) | 15.1 | 1.22 |
| Example 5 | 2500 | 67.4 | 2.1 | 25.0 | 5.5 | 30.5 | Carboxyl group | (1-5) | 14.1 | 0.44 |
| Example 6 | 2500 | 72.9 | 2.1 | 25.0 | 5.5 | 30.5 | Amino group | (2) | 12.1 | 0.41 |
| Example 7 | 200 | 67.4 | 2.1 | 25.0 | 5.5 | 30.5 | Carboxyl group | (1-4) | 15.1 | 0.44 |
| Example 8 | 450 | 67.4 | 2.1 | 25.0 | 5.5 | 30.5 | Carboxyl group | (1-4) | 15.1 | 0.44 |
| Example 9 | 3800 | 67.4 | 2.1 | 25.0 | 5.5 | 30.5 | Carboxyl group | (1-4) | 15.1 | 0.44 |
| Example 10 | 5000 | 67.4 | 2.1 | 25.0 | 5.5 | 30.5 | Carboxyl group | (1-4) | 15.1 | 0.44 |
| Example 11 | 2500 | 71.3 | 2.1 | 21.5 | 5.1 | 26.6 | Carboxyl group | (1-4) | 15.1 | 0.36 |
| Example 12 | 2500 | 38.9 | 2.1 | 44.5 | 14.5 | 59.0 | Carboxyl group | (1-4) | 15.1 | 1.44 |
| Example 13 | 2500 | 73.8 | 2.1 | 19.0 | 5.1 | 24.1 | Carboxyl group | (1-4) | 15.1 | 0.32 |
| Example 14 | 2500 | 36.9 | 2.1 | 45.5 | 15.5 | 61.0 | Carboxyl group | (1-4) | 15.1 | 1.56 |
| Example 15 | 2500 | 74.8 | 2.1 | 18.0 | 5.1 | 23.1 | Carboxyl group | (1-4) | 15.1 | 0.30 |
| Example 16 | 2500 | 70.8 | 2.1 | 22.0 | 5.1 | 27.1 | Carboxyl group | (1-4) | 15.1 | 0.37 |
| Example 17 | 2500 | 39.9 | 2.1 | 48.0 | 10.0 | 58.0 | Carboxyl group | (1-4) | 15.1 | 1.38 |
| Example 18 | 2500 | 36.4 | 2.1 | 48.0 | 13.5 | 61.5 | Carboxyl group | (1-4) | 15.1 | 1.60 |

TABLE 2

| | Polyvinyl acetal resin | | | | | | | | |
|---|---|---|---|---|---|---|---|---|---|
| | Average degree of polymerization | Acetal group content (mol %) | Acetyl group content (mol %) | Hydroxyl group content (mol %) | Amount of modified group-containing constitutional unit (mol %) | Hydroxyl group content + Hydrogen-bonding group content (mol %) | Type of modified group | Structure of modified group-containing constitutional unit | SP value of modified group-containing constitutional unit | Hydrophilic unit/ Hydrophobic unit |
| Example 19 | 2500 | 67.4 | 2.1 | 25.0 | 5.5 | 30.5 | Carboxyl group | (1-4) | 15.1 | 0.44 |
| Example 20 | 2500 | 67.4 | 2.1 | 25.0 | 5.5 | 30.5 | Carboxyl group | (1-4) | 15.1 | 0.44 |
| Example 21 | 2500 | 67.4 | 2.1 | 25.0 | 5.5 | 30.5 | Carboxyl group | (1-4) | 15.1 | 0.44 |
| Example 22 | 2500 | 67.4 | 2.1 | 25.0 | 5.5 | 30.5 | Carboxyl group | (1-4) | 15.1 | 0.44 |
| Example 23 | 2500 | 32.9 | 2.1 | 45.0 | 20.0 | 65.0 | Carboxyl group | (1-4) | 15.1 | 1.86 |
| Example 24 | 2500 | 74.7 | 2.1 | 18.0 | 5.2 | 23.2 | Carboxyl group | (1-4) | 15.1 | 0.30 |
| Example 25 | 2500 | 67.3 | 2.1 | 25.5 | 5.1 | 30.6 | Sulfonic acid group | (3) | 20.2 | 0.44 |

TABLE 2-continued

| | Polyvinyl acetal resin | | | | | | | | |
|---|---|---|---|---|---|---|---|---|---|
| | Average degree of polymerization | Acetal group content (mol %) | Acetyl group content (mol %) | Hydroxyl group content (mol %) | Amount of modified group-containing constitutional unit (mol %) | Hydroxyl group content + Hydrogen-bonding group content (mol %) | Type of modified group | Structure of modified group-containing constitutional unit | SP value of modified group-containing constitutional unit | Hydrophilic unit/ Hydrophobic unit |
| Example 26 | 2500 | 66.9 | 2.1 | 25.5 | 5.5 | 31.0 | Ethylene oxide group | (4) | 10.9 | 0.34 |
| Example 27 | 2500 | 82.5 | 2.1 | 8.9 | 6.5 | 15.4 | Carboxyl group | (1-4) | 15.1 | 0.18 |
| Example 28 | 2500 | 37.2 | 2.1 | 55.2 | 5.5 | 60.7 | Carboxyl group | (1-4) | 15.1 | 1.54 |
| Example 29 | 2500 | 69.4 | 2.1 | 25.0 | 3.5 | 28.5 | Carboxyl group | (1-4) | 15.1 | 0.40 |
| Example 30 | 2500 | 39.4 | 2.1 | 25.0 | 33.5 | 58.5 | Carboxyl group | (1-4) | 15.1 | 1.41 |
| Example 31 | 2500 | 83.9 | 2.1 | 8.9 | 5.1 | 14.0 | Carboxyl group | (1-4) | 15.1 | 0.16 |
| Example 32 | 2500 | 30.9 | 2.1 | 35.0 | 32.0 | 67.0 | Carboxyl group | (1-4) | 15.1 | 2.03 |
| Example 33 | 2500 | 85.5 | 2.1 | 8.9 | 3.5 | 12.4 | Carboxyl group | (1-4) | 15.1 | 0.14 |
| Comparative 1 Example | 2500 | 72.9 | 2.1 | 25.0 | — | 25.0 | — | — | — | 0.33 |
| Comparative 2 Example | 2500 | 17.9 | 2.1 | 65.0 | 15.0 | 80.0 | Carboxyl group | (1-4) | 15.1 | 4.00 |
| Comparative 3 Example | 2500 | 67.9 | 2.1 | 8.0 | 0.4 | 8.4 | Carboxyl group | (1-4) | 15.1 | 0.12 |
| Comparative 4 Example | 2500 | 67.4 | 2.1 | 25.0 | 5.5 | 25.0 | tert-Butyl group | (6) | 8.1 | 0.33 |

TABLE 3

| | Epoxy resin composition | | | | | | | |
|---|---|---|---|---|---|---|---|---|
| | Polyvinyl acetal resin (parts by weight) | Epoxy resin (parts by weight) | | Curing agent (parts by weight) Dicyandiamide | Curing accelerator (parts by weight) Imidazole compound | Inorganic filler (parts by weight) Calcium carbonate | (Number of hydroxyl groups + Number of hydrogen-bonding groups)/ Number of epoxy groups | Number of hydrogen-bonding groups/ Number of epoxy groups |
| | | Bisphenol A-type epoxy resin | Propylene glycol diglycidyl ether | | | | | |
| Example 1 | 20 | 80 | 20 | 3 | 2 | 10 | 0.226 | 0.066 |
| Example 2 | 20 | 80 | 20 | 3 | 2 | 10 | 0.386 | 0.257 |
| Example 3 | 20 | 80 | 20 | 3 | 2 | 10 | 0.273 | 0.121 |
| Example 4 | 20 | 80 | 20 | 3 | 2 | 10 | 0.410 | 0.093 |
| Example 5 | 20 | 80 | 20 | 3 | 2 | 10 | 0.188 | 0.019 |
| Example 6 | 20 | 80 | 20 | 3 | 2 | 10 | 0.201 | 0.036 |
| Example 7 | 20 | 80 | 20 | 3 | 2 | 10 | 0.230 | 0.070 |
| Example 8 | 20 | 80 | 20 | 3 | 2 | 10 | 0.230 | 0.070 |
| Example 9 | 20 | 80 | 20 | 3 | 2 | 10 | 0.230 | 0.070 |
| Example 10 | 20 | 80 | 20 | 3 | 2 | 10 | 0.230 | 0.070 |
| Example 11 | 20 | 80 | 20 | 3 | 2 | 10 | 0.202 | 0.065 |
| Example 12 | 20 | 80 | 20 | 3 | 2 | 10 | 0.440 | 0.174 |
| Example 13 | 20 | 80 | 20 | 3 | 2 | 10 | 0.185 | 0.065 |
| Example 14 | 20 | 80 | 20 | 3 | 2 | 10 | 0.454 | 0.184 |
| Example 15 | 20 | 80 | 20 | 3 | 2 | 10 | 0.179 | 0.065 |
| Example 16 | 20 | 80 | 20 | 3 | 2 | 10 | 0.206 | 0.065 |
| Example 17 | 20 | 80 | 20 | 3 | 2 | 10 | 0.433 | 0.127 |
| Example 18 | 20 | 80 | 20 | 3 | 2 | 10 | 0.458 | 0.165 |

TABLE 4

| | Polyvinyl acetal resin (Parts by weight) | Epoxy resin (parts by weight) | | Curing agent (parts by weight) Dicyandiamide | Curing accelerator (parts by weight) Imidazole compound | Inorganic filler (parts by weight) Calcium carbonate | (Number of hydroxyl groups + Number of hydrogen-bonding groups)/Number of epoxy groups | Number of hydrogen-bonding groups/Number of epoxy groups |
|---|---|---|---|---|---|---|---|---|
| | | Bisphenol A-type epoxy resin | Propylene glycol diglycidyl ether | | | | | |
| Example 19 | 3 | 80 | 20 | 3 | 2 | 10 | 0.035 | 0.011 |
| Example 20 | 6 | 80 | 20 | 3 | 2 | 10 | 0.069 | 0.021 |
| Example 21 | 28 | 80 | 20 | 3 | 2 | 10 | 0.323 | 0.099 |
| Example 22 | 40 | 80 | 20 | 3 | 2 | 10 | 0.461 | 0.141 |
| Example 23 | 44 | 80 | 20 | 3 | 2 | 10 | 1.053 | 0.496 |
| Example 24 | 2 | 80 | 20 | 3 | 2 | 10 | 0.018 | 0.007 |
| Example 25 | 20 | 80 | 20 | 3 | 2 | 10 | 0.201 | 0.033 |
| Example 26 | 20 | 80 | 20 | 3 | 2 | 10 | 0.174 | 0.031 |
| Example 27 | 20 | 80 | 20 | 3 | 2 | 10 | 0.134 | 0.079 |
| Example 28 | 20 | 80 | 20 | 3 | 2 | 10 | 0.454 | 0.075 |
| Example 29 | 20 | 80 | 20 | 3 | 2 | 10 | 0.210 | 0.046 |
| Example 30 | 20 | 80 | 20 | 3 | 2 | 10 | 0.436 | 0.318 |
| Example 31 | 20 | 80 | 20 | 3 | 2 | 10 | 0.119 | 0.063 |
| Example 32 | 20 | 80 | 20 | 3 | 2 | 10 | 0.484 | 0.313 |
| Example 33 | 20 | 80 | 20 | 3 | 2 | 10 | 0.101 | 0.044 |
| Comparative Example 1 | 20 | 80 | 20 | 3 | 2 | 10 | 0.172 | — |
| Comparative Example 2 | 20 | 80 | 20 | 3 | 2 | 10 | 0.591 | 0.186 |
| Comparative Example 3 | 20 | 80 | 20 | 3 | 2 | 10 | 0.074 | 0.007 |
| Comparative Example 4 | 30 | 80 | 20 | 3 | 2 | 10 | 0.278 | — |

<Evaluation>

The following evaluations were performed on the polyvinyl acetal resins and epoxy resin compositions obtained in the examples and comparative examples. Tables 5 and 6 show the results.

(1) Equilibrium Moisture Absorption

The polyvinyl acetal resins obtained in the examples and comparative examples were each dried in a vacuum oven to a moisture content of 0.5% or lower, and exposed to an environment of 40° C. and 90% RH for seven days. Based on the weight change of the resulting polyvinyl acetal resin taken as the amount of absorbed moisture, the moisture absorption rate was calculated. The obtained moisture absorption rate was taken as the equilibrium moisture absorption (% by weight). It is to be noted that the equilibrium moisture absorption is different from the conventional moisture content.

(2) Speed of Moisture Absorption

The obtained polyvinyl acetal resins were each dried in a vacuum oven to a moisture content of 0.5% or lower, and exposed to an environment of 40° C. and 90% RH for seven days. The speed of moisture absorption (g/g/h) was calculated by dividing the amount (g/g) of moisture absorbed by 1 g of the polyvinyl acetal resin when the equilibrium moisture absorption was achieved by the time (h) to reach the equilibrium moisture absorption.

(3) 5% Resin Viscosity

The obtained polyvinyl acetal resins were each dissolved in a solvent mixture containing ethanol and toluene at a ratio of 1:1 to prepare a 5% by weight solution. The viscosity of the obtained solution was measured with a B-type viscometer at a solution temperature of 20° C.

(4) Elastic Modulus

The polyvinyl acetal resins obtained in the examples and comparative examples were each dissolved in a solvent mixture containing ethanol and toluene at a ratio of 1:1 at a concentration of 30% by weight to prepare a polyvinyl acetal resin solution.

The obtained polyvinyl acetal resin solution was applied to a 100 μm-thick polyethylene terephthalate film to a dry thickness of 20 μm. The resulting polyvinyl acetal film was peeled from the polyethylene terephthalate film and cut into a 1×5 cm piece. Using the obtained film piece, the elastic modulus (MPa) was measured with an autograph (AGS-J available from Shimadzu Corporation) at 25° C. and a tensile speed of 30 mm/min.

(5) Gel Fraction

The obtained epoxy resin compositions were each applied to aluminum foil to a dry thickness of 100 μm. The applied composition was heated at 160° C. for 30 minutes to be cured. To the resulting epoxy resin sheet (about 0.1 g) (w1) was added 40 g of a solvent mixture containing toluene and ethanol at a weight ratio of 1:1, followed by stirring for 24 hours. The resulting solution was subjected to solid-liquid separation using a 200-mesh stainless steel sieve the mass (w2) of which had been weighed in advance. The stainless-steel sieve was taken out, and dried in vacuum at 100° C. for one hour, followed by measurement of the mass (w3) thereof. The gel fraction was calculated by the following equation.

Gel fraction (% by weight)={(w3−w2)/w1}×100

(6) Storage Stability

The obtained epoxy resin compositions were each subjected to measurement of the viscosity right after the preparation and after one month from the preparation using a B-type viscometer to determine the change rate of the viscosity. The evaluation was performed in accordance with the following criteria.
  ○ (Good): lower than 10%
  Δ (Fair): 10% or higher but lower than 25%
  x (Poor): 25% or higher (7) Tensile Elongation The obtained epoxy resin compositions were each poured into a mold and heated at 160° C. for 30 minutes to be cured. Thus, a dumbbell-shaped specimen was provided. Using the obtained dumbbell-shaped specimen, a tensile test in conformity with JIS K7161 was performed at 25° C. and a tensile speed of 5 mm/min to determine the tensile elongation (%).

(8) Shear Adhesion

The obtained epoxy resin compositions were each applied to a SPCC steel plate to a contact surface area of 300 mm² and a thickness after curing of 100 μm and another SPCC steel plate was attached thereto. Thus, a test specimen was provided. The resulting test specimen was heated at 160° C. for 30 minutes for curing, and subjected to measurement of the shear adhesion (MPa) by a method in conformity with JIS K 6850 at a measurement temperature of 25° C. and a tensile speed of 5 ram/min.

(9) Peel Adhesion

The obtained epoxy resin compositions were each applied to a SPCC steel plate to a thickness after curing of 200 μm and another SPCC steel plate was attached thereto. Thus, a specimen for T-peel test was provided. The obtained specimen was heated at 160° C. for 30 minutes for curing, and subjected to measurement of the peel adhesion (N/25 mm) by a method in conformity with JIS K 6854 at a measurement temperature of 25° C. and a tensile speed of 100 mm/min.

(10) Moisture Resistance (Peel Adhesion and Adhesive Retention in High-Temperature, High-Humidity Environment)

A specimen for T-peel test was provided as in (9) Peel adhesion. The obtained specimen was exposed to an environment of a temperature of 85° C. and a humidity of 85% RH for seven days. Then, the peel adhesion (N/25 mm) in a high-temperature, high-humidity environment was measured as in (9) Peel adhesive force. The proportion of the peel adhesion in a high-temperature, high-humidity environment to the (9) Peel adhesion was calculated for evaluation of the adhesive retention (%).

(11) Impact Resistance (Charpy Impact Value)

The obtained epoxy resin compositions were each poured into a mold and heated at 160° C. for 30 minutes, thereby preparing a specimen for Charpy impact test. The obtained specimen was subjected to a Charpy impact test by a method in conformity with JIS K 7111 using a digital impact tester DG-UB type (product of Toyo Seiki Seisakusho, Ltd.). Based on the measured Charpy impact value (kJ/m²) upon breakage of the resin cured product, the impact resistance was evaluated.

TABLE 5

| | Evaluation | | | | | | | | | | |
|---|---|---|---|---|---|---|---|---|---|---|---|
| | Epoxy resin composition | | | | | | | | | | |
| | Polyvinyl acetal resin | | | | | | | | Moisture resistance | | |
| | Equilibrium moisture absorption (wt %) | Speed of moisture absorption (g/g/h) | 5% resin viscosity (mPa·s) | Elastic modulus (Mpa) | Gel fraction (wt %) | Storage stability | Tensile elongation (%) | Shear adhesion (Mpa) | Peel adhesion (N/25 mm) | Peel adhesion in high-temperature, high-humidity environment (N/25 mm) | Adhesive retention (%) | Impact resistance Charpy impact value (kJ/m²) |
| Example 1 | 6.6 | 0.0034 | 222 | 1050 | 99.6 | Good | 8.7 | 33.4 | 125 | 108 | 86.4 | 3.5 |
| Example 2 | 14.3 | 0.0074 | 220 | 1550 | 99.8 | Good | 11.5 | 35.4 | 166 | 159 | 95.8 | 6.7 |
| Example 3 | 10.2 | 0.0053 | 220 | 1320 | 99.7 | Good | 12.1 | 36.1 | 158 | 149 | 94.3 | 3.6 |
| Example 4 | 18.7 | 0.0097 | 224 | 1700 | 98.8 | Fair | 6.4 | 38.9 | 145 | 124 | 85.5 | 3.5 |
| Example 5 | 5.8 | 0.0030 | 221 | 1080 | 99.0 | Good | 9.1 | 35.5 | 130 | 108 | 83.1 | 4.9 |
| Example 6 | 5.1 | 0.0027 | 223 | 990 | 95.8 | Fair | 6.2 | 30.3 | 108 | 88 | 81.5 | 3.6 |
| Example 7 | 7.1 | 0.0037 | 12 | 1200 | 99.5 | Good | 7.1 | 32.5 | 128 | 117 | 91.4 | 4.2 |
| Example 8 | 7.7 | 0.0040 | 41 | 1180 | 99.1 | Good | 7.6 | 33.3 | 122 | 113 | 92.6 | 4.2 |
| Example 9 | 7.7 | 0.0040 | 390 | 990 | 99.4 | Good | 9.4 | 34.2 | 125 | 116 | 92.8 | 5.1 |
| Example 10 | 7.5 | 0.0039 | 445 | 970 | 99.4 | Good | 10 | 31.9 | 120 | 111 | 92.5 | 5.4 |
| Example 11 | 7.2 | 0.0038 | 225 | 820 | 99.7 | Good | 8.4 | 31.9 | 118 | 108 | 91.5 | 4.7 |
| Example 12 | 14.8 | 0.0077 | 230 | 1620 | 96.5 | Fair | 5.9 | 38.5 | 141 | 136 | 96.5 | 3.7 |
| Example 13 | 6.1 | 0.0032 | 210 | 790 | 99.1 | Good | 8.6 | 32.1 | 112 | 96 | 85.7 | 4.9 |
| Example 14 | 17.5 | 0.0091 | 232 | 1680 | 97.2 | Fair | 5.6 | 37.9 | 136 | 119 | 87.5 | 3.5 |
| Example 15 | 5.5 | 0.0029 | 208 | 780 | 99.6 | Good | 8.6 | 31.5 | 111 | 91 | 82.0 | 3.7 |
| Example 16 | 7.4 | 0.0039 | 212 | 880 | 99.4 | Good | 8.3 | 31.9 | 120 | 111 | 92.5 | 3.6 |
| Example 17 | 14.1 | 0.0073 | 232 | 1720 | 99.6 | Fair | 5.7 | 38.3 | 138 | 132 | 95.7 | 5.4 |
| Example 18 | 18.8 | 0.0098 | 248 | 1720 | 99.1 | Fair | 5.6 | 37.7 | 136 | 117 | 86.0 | 5.6 |

TABLE 6

| | Polyvinyl acetal resin | | | Expoxy resin composition | | | | | | Moisture resistance | | |
|---|---|---|---|---|---|---|---|---|---|---|---|---|
| | Equi-librium water absorp-tion (wt %) | Speed of water absorp-tion (g/g/h) | 5% resin vis-cosity (mPa · s) | Elastic modulus (Mpa) | Gel fraction (wt %) | Storage stability | Ten-sile elon-gation (%) | Shear adhesion (Mpa) | Peel adhesion (N/25 mm) | Peel adhesion in high-temper-ature, high-humidity environ-ment (N/25 mm) | Ad-hesive retention (%) | Impact resistance Charpy impact (kJ/m²) |
| Example 19 | 6.8 | 0.0035 | 221 | 1080 | 99.5 | Good | 4.3 | 25.6 | 82 | 70 | 85.4 | 2.5 |
| Example 20 | 6.8 | 0.0035 | 221 | 1080 | 99.6 | Good | 4.7 | 27.0 | 101 | 85 | 84.2 | 2.8 |
| Example 21 | 6.8 | 0.0035 | 221 | 1080 | 98.6 | Fair | 5.1 | 39.5 | 170 | 151 | 88.8 | 5.6 |
| Example 22 | 6.8 | 0.0035 | 221 | 1080 | 90.5 | Fair | 4.1 | 35.1 | 125 | 107 | 85.6 | 5.5 |
| Example 23 | 19.2 | 0.0100 | 251 | 1750 | 91.7 | Fair | 5.0 | 34.7 | 132 | 113 | 85.6 | 4.6 |
| Example 24 | 5.7 | 0.0030 | 209 | 780 | 99.5 | Good | 8.8 | 31.8 | 77 | 64 | 83.1 | 3.8 |
| Example 25 | 18.8 | 0.0135 | 214 | 1340 | 90.2 | Fair | 5.1 | 24.8 | 110 | 99 | 90.2 | 3.2 |
| Example 26 | 5.1 | 0.0025 | 245 | 620 | 91.0 | Fair | 9.2 | 23.2 | 110 | 73 | 66.0 | 5.2 |
| Example 27 | 5.4 | 0.0022 | 205 | 760 | 98.9 | Good | 7.1 | 31.8 | 142 | 102 | 72.0 | 5.2 |
| Example 28 | 18.6 | 0.0051 | 238 | 1480 | 98.2 | Fair | 8.0 | 32.0 | 134 | 114 | 85.1 | 4.0 |
| Example 29 | 5.2 | 0.0018 | 198 | 720 | 97.8 | Good | 5.8 | 30.1 | 121 | 96 | 79.6 | 3.4 |
| Example 30 | 19.5 | 0.0130 | 281 | 1840 | 99.7 | Fair | 7.4 | 27.5 | 123 | 112 | 91.2 | 2.4 |
| Example 31 | 5.2 | 0.0020 | 195 | 750 | 98.4 | Good | 6.5 | 26.2 | 138 | 97 | 70.6 | 4.5 |
| Example 32 | 19.8 | 0.0160 | 275 | 1920 | 99.6 | Fair | 7.1 | 26.8 | 117 | 99 | 84.2 | 2.7 |
| Example 33 | 5.0 | 0.0016 | 190 | 700 | 96.8 | Good | 5.0 | 25.0 | 72 | 49 | 68.7 | 3.1 |
| Comparative 1 Example | 4.3 | 0.0016 | 217 | 660 | 88.9 | Good | 5.5 | 24.5 | 54 | 26 | 48.1 | 2.2 |
| Comparative 2 Example | 24.8 | 0.0172 | 293 | 2250 | 92.2 | Poor | 4.1 | 30.7 | 100 | 69 | 57.5 | 2.6 |
| Comparative 3 Example | 3.2 | 0.0017 | 186 | 520 | 99.5 | Good | 3.9 | 19.8 | 108 | 45 | 41.7 | 2.1 |
| Comparative 4 Example | 2.4 | 0.0013 | 260 | 620 | 91.3 | Poor | 5.6 | 20.0 | 61 | 31 | 50.8 | 3.0 |

INDUSTRIAL APPLICABILITY

The present invention can provide an epoxy resin composition capable of exhibiting high moisture resistance and reducing reduction in adhesion at high temperature and high humidity.

The invention claimed is:

1. An epoxy resin composition comprising:
a modified polyvinyl acetal resin comprising a hydrogen-bonding group-containing constitutional unit; and
an epoxy resin,
wherein the hydrogen-bonding group-containing constitutional unit contains at least one constitutional unit selected from the group consisting of a carboxyl group-containing constitutional unit, a sulfonic acid group-containing constitutional unit, an amide group-containing constitutional unit, a phosphoric acid group-containing constitutional unit, a pyrrolidone ring group-containing constitutional unit, and an ethylene oxide group-containing constitutional unit,
the carboxyl group-containing constitutional unit is at least one selected from the group consisting of a constitutional unit represented by the following formula (1-2), a constitutional unit represented by the following formula (1-3), a constitutional unit represented by the following formula (1-4), and a constitutional unit represented by the following formula (1-5),

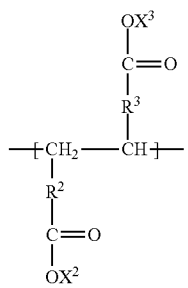
(1-2)

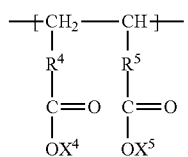
(1-3)

-continued

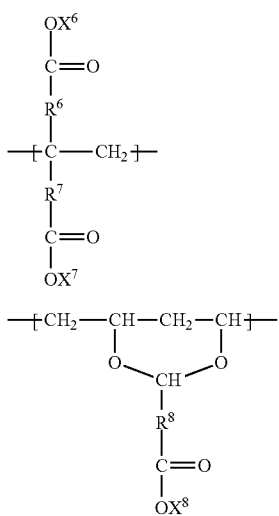

wherein, in the formula (1-2), $R^2$ and $R^3$ each independently represent a single bond or a C1-C10 alkylene group and $X^2$ and $X^3$ each independently represent a hydrogen atom, a metal atom, or a methyl group, in the formula (1-3), $R^4$ and $R^5$ each independently represent a single bond or a C1-C10 alkylene group and $X^4$ and $X^5$ each independently represent a hydrogen atom, a metal atom, or a methyl group, in the formula (1-4), $R^6$ and $R^7$ each independently represent a single bond or a C1-C10 alkylene group and $X^6$ and $X^7$ each independently represent a hydrogen atom, a metal atom, or a methyl group, and in the formula (1-5), $R^8$ represents a single bond or a C1-C10 alkylene group and $X^8$ represents a hydrogen atom, a metal atom, or a methyl group, the sulfonic acid group-containing constitutional unit is a constitutional unit represented by the following formula (3),

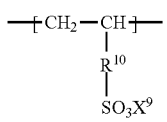

wherein, in the formula (3), $R^{10}$ represents a single bond or a C1-C10 alkylene group and $X^9$ represents a hydrogen atom, a metal atom, or a methyl group, wherein the modified polyvinyl acetal resin comprising the hydrogen-bonding group-containing constitutional unit further comprises a hydroxyl group, the modified polyvinyl acetal resin comprises the hydrogen-bonding group-containing constitutional unit and the hydroxyl group in a total amount of 15.4 to 61.5 mol %, the modified polyvinyl acetal resin comprising the hydrogen-bonding group-containing constitutional unit comprises the hydrogen-bonding group-containing constitutional unit in an amount of 5.1 to 30.0 mol %, the modified polyvinyl acetal resin comprising the hydrogen-bonding group-containing constitutional unit has an average degree of polymerization of 400 to 4,000, and the modified polyvinyl acetal resin has an equilibrium moisture absorption of 5 to 20% by weight as measured with an infrared moisture meter after standing at 40° C. and 90% RH for seven days.

2. The epoxy resin composition according to claim 1, wherein the modified polyvinyl acetal resin comprising the hydrogen-bonding group-containing constitutional unit has an SP value of 11.0 to 18.5.

3. The epoxy resin composition according to claim 1, wherein the modified polyvinyl acetal resin comprising the hydrogen-bonding group-containing constitutional unit comprises the hydroxyl group in an amount of 10.0 to 50.0 mol %.

4. The epoxy resin composition according to claim 1, wherein the modified polyvinyl acetal resin comprising the hydrogen-bonding group-containing constitutional unit further comprises an acetal group in an amount of 35.0 to 85.0 mol %.

5. The epoxy resin composition according to claim 1, wherein the modified polyvinyl acetal resin comprising the hydrogen-bonding group-containing constitutional unit further comprises an acetyl group in an amount of 0.1 to 20.0 mol %.

6. The epoxy resin composition according to claim 1, wherein the modified polyvinyl acetal resin comprising the hydrogen-bonding group-containing constitutional unit is present in an amount of 0.1 to 50 parts by weight per 100 parts by weight of the epoxy resin.

7. The epoxy resin composition according to claim 1, further comprising an inorganic filler.

8. The epoxy resin composition according to claim 1, wherein a mole ratio (hydrophilic unit/hydrophobic unit) between a hydrophilic unit and a hydrophobic unit in the modified polyvinyl acetal resin comprising the hydrogen-bonding group-containing constitutional unit is 0.37 or higher.

* * * * *